United States Patent
Lossov et al.

(10) Patent No.: US 10,621,401 B2
(45) Date of Patent: Apr. 14, 2020

(54) SELF-SERVICE PARCEL TERMINAL WITH OPTIMIZED SHELVING ARRANGEMENT

(71) Applicant: Cleveron AS, Viljandi (EE)

(72) Inventors: Remi Lossov, Viljandi (EE); Lauri Hirvesaar, Tallinn (EE); Mikk Noorkoiv, Viljandimaa (EE); Mart Roht, Viljandi (EE)

(73) Assignee: Cleveron AS, Viljandi (EE)

( * ) Notice: Subject to any disclaimer, the term of this patent is extended or adjusted under 35 U.S.C. 154(b) by 0 days.

(21) Appl. No.: 16/172,031

(22) Filed: Oct. 26, 2018

(65) Prior Publication Data

US 2019/0065801 A1 Feb. 28, 2019

Related U.S. Application Data

(63) Continuation of application No. 15/262,125, filed on Sep. 12, 2016, now Pat. No. 10,114,996.

(60) Provisional application No. 62/217,864, filed on Sep. 12, 2015.

(51) Int. Cl.
| | |
|---|---|
| *G06K 7/14* | (2006.01) |
| *G07F 17/10* | (2006.01) |
| *G07F 11/10* | (2006.01) |
| *G07F 11/16* | (2006.01) |
| *G07F 11/42* | (2006.01) |
| *G07F 17/00* | (2006.01) |

(52) U.S. Cl.
CPC ............ *G06K 7/1417* (2013.01); *G07F 11/10* (2013.01); *G07F 11/165* (2013.01); *G07F 11/42* (2013.01); *G07F 17/0014* (2013.01); *G07F 17/10* (2013.01)

(58) Field of Classification Search
CPC combination set(s) only.
See application file for complete search history.

(56) References Cited

U.S. PATENT DOCUMENTS

| | | | |
|---|---|---|---|
| 5,042,686 A | 8/1991 | Stucki | |
| 9,745,130 B1* | 8/2017 | Rawal | G06Q 10/0836 |
| 2008/0121646 A1 | 5/2008 | Schininger et al. | |
| 2011/0020098 A1* | 1/2011 | Pfaffmann | B65G 1/0421 |
| | | | 414/274 |

(Continued)

FOREIGN PATENT DOCUMENTS

EP 1358117 B1 8/2004

*Primary Examiner* — Kyle O Logan
(74) *Attorney, Agent, or Firm* — Berggren LLP; Leea Susanne Somersalo

(57) ABSTRACT

This disclosure includes a parcel terminal that may include a shelving unit comprising a plurality of shelves that are separated by respective predetermined distances along a dimension of the unit. In an embodiment, the plurality of shelves may be evenly spaced. The parcel terminal may further include a receptacle for receiving a parcel from a user, a loader configured to transfer the parcel from the receptacle to a shelf on the shelving unit, and an electronic controller in electronic communication with the loader. The electronic controller may be configured to determine a number of open shelves required to accommodate the parcel based on a size of the parcel and on the respective predetermined distances, to select a set of shelves having at least the required number of open shelves, and to initiate movement of the loader so as to place the parcel within the selected set of shelves.

19 Claims, 15 Drawing Sheets

(56) References Cited

U.S. PATENT DOCUMENTS

2013/0264381 A1* 10/2013 Kim .................. G07F 17/12
                                                    232/24
2014/0301811 A1   10/2014 Langhoff
2015/0302351 A1* 10/2015 Cassady ............ B65G 1/137
                                                    705/339
2015/0324760 A1* 11/2015 Borowski .......... B65F 1/0006
                                                    705/308

* cited by examiner

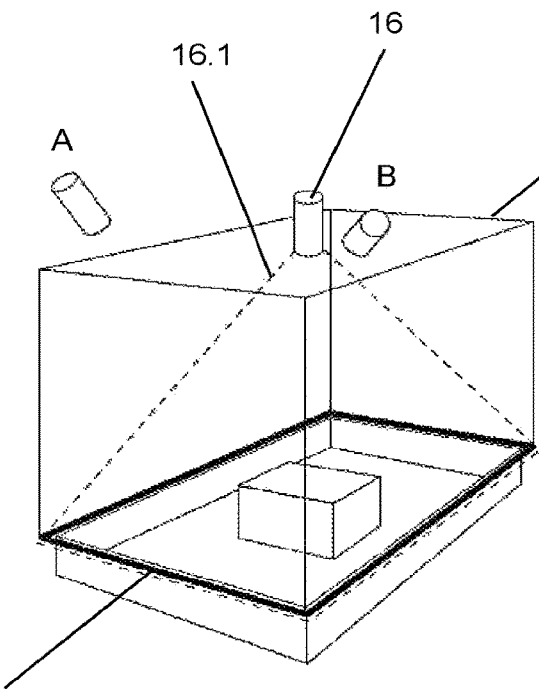
FIG 9a
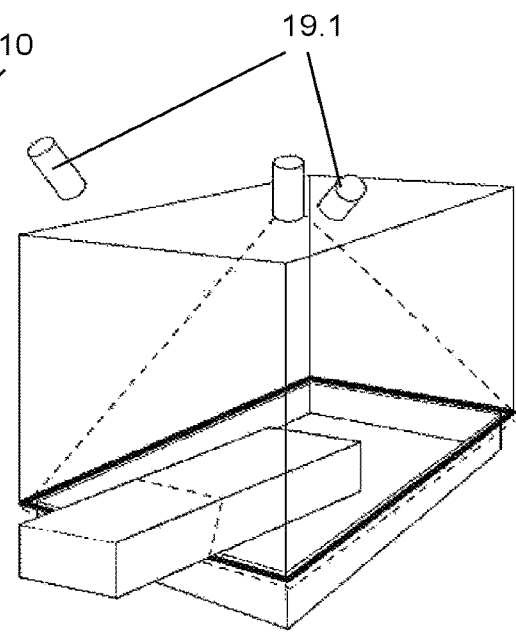
FIG 9c
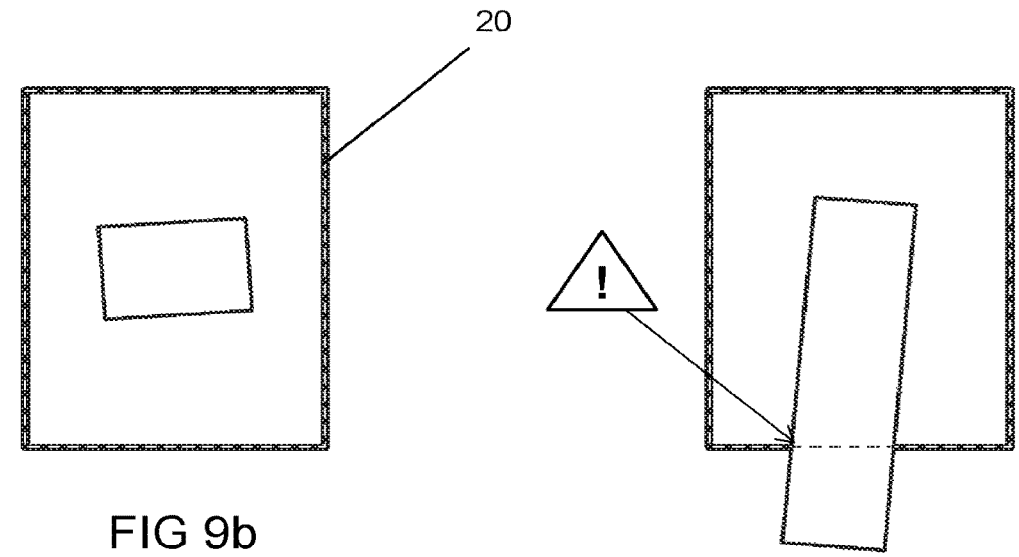
FIG 9b
FIG 9d

SELF-SERVICE PARCEL TERMINAL WITH OPTIMIZED SHELVING ARRANGEMENT

CROSS-REFERENCE TO RELATED APPLICATION

This application claims the benefit of priority to U.S. provisional application No. 62/217,864, filed Sep. 12, 2015, which is hereby incorporated by reference in its entirety.

FIELD OF THE DISCLOSURE

The present disclosure relates to the field self-service parcel delivery, including self-service parcel terminals and methods of controlling and using such self-service parcel terminals.

BACKGROUND OF RELATED ART

Several different automated devices and terminals for postal objects are known. Parcel terminals with separate lockers or shelf-drawers for each parcel are widely known. Such parcel terminals take up much space, are inefficient for use as the capacity of the parcel terminal remains unused, and upon sending or receiving several parcels it is time-consuming to load and deliver parcels.

European patent EP1358117B1 describes a tower-like stationary parcel terminal where shelves with drawers for storing parcel containers have been placed around a transportation mechanism fastened on a circular base. The drawback of such a solution is its ineffective usage of space, as the drawers of specific fixed sizes leave some of the space on the shelf unused while storing goods on the shelves.

SUMMARY

A parcel terminal may include a shelving unit comprising a plurality of shelves that are separated by respective predetermined distances along a dimension of the unit. In an embodiment, the plurality of shelves may be evenly spaced. The parcel terminal may further include a receptacle for receiving a parcel from a user, a loader configured to transfer the parcel from the receptacle to a shelf on the shelving unit, and an electronic controller in electronic communication with the loader. The electronic controller may be configured to determine a number of open shelves required to accommodate the parcel based on a size of the parcel and on the respective predetermined distances, to select a set of shelves having at least the required number of open shelves, and to initiate movement of the loader so as to place the parcel within the selected set of shelves.

A computerized method of controlling a parcel terminal, the parcel terminal comprising a plurality of shelves that are separated by respective predetermined distances along a dimension of the unit may include receiving data indicative of a size of a parcel placed in a receptacle of the parcel terminal. The method may further include calculating a number of open shelves required to store the parcel according to the respective predetermined distances and the data indicative of the size of the parcel, selecting a set of shelves of the plurality of shelves having the required number of open shelves, and initiating movement of a loader of the parcel terminal to transfer the parcel from the receptacle to the selected set of shelves.

BRIEF DESCRIPTION OF THE DRAWINGS

FIGS. 9a to 9d are diagrammatic depictions of an example system for recognizing an oversized or improperly placed parcel and displaying a picture of the parcel for the user that may be provided in a parcel terminal in accordance with the present disclosure.

DETAILED DESCRIPTION

Figures 1A, 1B, 1C:
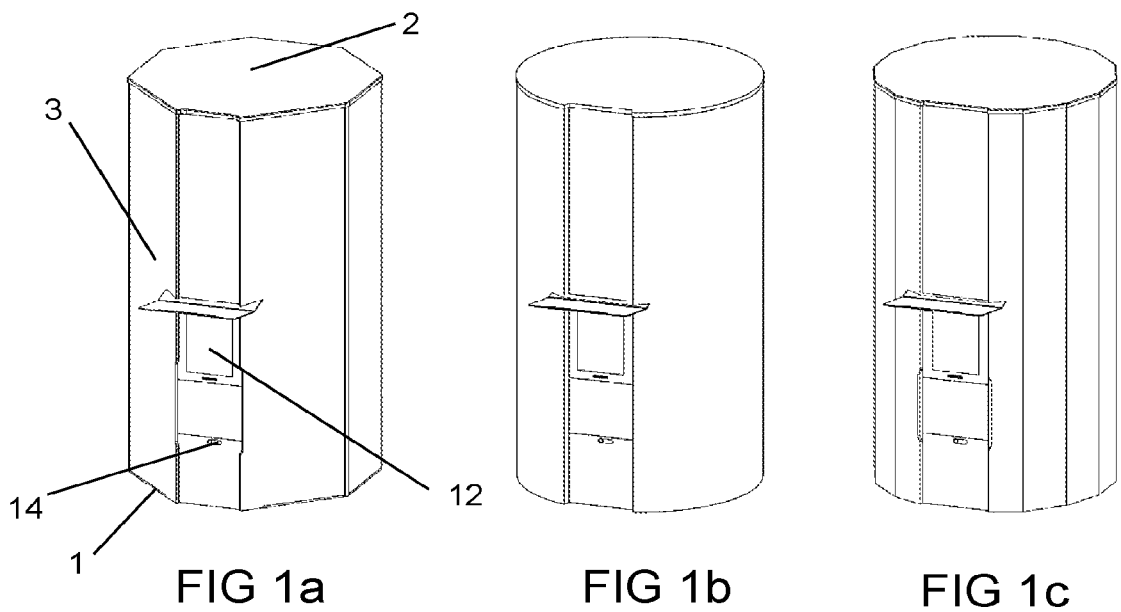
FIGS. 1a, 1b, and 1c are diagrammatic depictions of example exteriors of a parcel terminal in accordance with the present disclosure.

A parcel terminal according to the present disclosure, and the use of a parcel terminal according to the present disclosure, may offer a more effective and faster device and method of sending and receiving parcels compared to known solutions. A parcel terminal according to the present disclosure may accommodate large number of parcels—a larger number than known solutions of comparable size—while providing fast and effective sending as well as receiving of the parcels.

Unlike known parcel terminals, which typically have separate lockers or shelf-drawers for each parcel in which most of the space in the lockers or shelf-drawers remains unused, and sending as well as receiving parcels is time-consuming, a parcel terminal according to the present disclosure may store each parcel in such a way that the stored parcel may occupy space according to its size only. A parcel terminal according to the present disclosure may include a tower-shaped parcel terminal with one loading and delivery opening, with a multitude of shelves for storing parcels arranged in a circular fashion around an upright parcel transportation boom.

In order to store parcels in the parcel terminal efficiently and quickly, parcels loaded in the parcel terminal may be measured and weighed automatically, and the measurement details of each parcel may be connected to their identification codes generated for single use.

The one opening for loading and delivering parcels also may enable a stable temperature in the parcel terminal, as the change of air in the parcel terminal may only take place while loading or delivering (i.e., retrieving) parcels. The stable temperature inside the parcel terminal may make it possible to use the parcel terminal indoors and outdoors all year round.

In use of a parcel terminal according to the present disclosure, the user may identify himself or herself with a unique code generated earlier with a smart device or web application, such as a QR-code, a bar code, a combination of numbers/letters, etc. The code may include data about the user, whether the user is a courier who wishes to send or receive parcels, or some other user wishing to send or receive a parcel.

A QR-code, a bar code or some other type of a single-use universal code may be generated for the user, in one case according to the user's data, and in another case according to the data of the loaded parcel. A QR-code may be preferred, as it may allow more information to be included in one code and is a universal code read by all 2D scanners. Alternative embodiments may make use of bar codes or other codes. If a courier is the user, then in order to register couriers in the server—who visited which parcel terminal and when—each courier may be each assigned an ID number that may be added every time to each newly generated user code. Upon generating a parcel code, the data may be sent to the server after loading the parcel in the parcel terminal.

In order to store parcels as tightly as possible, the distances between rails of the shelves may be smaller than the height of the parcel container being placed onto the shelf between the rails. The main boom loader of the terminal may move up and down, and the boom together with the loader may turn up to 315 degrees both ways, in embodiments. Loading the parcel container onto the loader may take place, for example, with the help of a magnetic or mechanical mechanism. A magnetic plate may be attached to the boom and loader side of the parcel container. The magnetic mechanism of the loader may be guided against the magnetic plate of the parcel container and may thus be used to pull the parcel container on the loader.

To load a parcel in the parcel terminal, an empty parcel container may be brought to the console and a parcel may be loaded on the parcel container through the console door opening. The height of the parcel may be measured, the parcel may be weighed and taken onto a shelf that has suitable vacant space. In an embodiment, the parcel may be placed as close to the topmost parcel shelf as possible. In an embodiment, the larger the height of a parcel, the higher the terminal may seek to store the parcel. In an embodiment, parcels may be stored as close as possible to the console to reduce the time required to retrieve a parcel for a user. For example, if the terminal includes a plurality of shelving racks, a rack nearest to the console may be preferred if space is available on it. When a moment comes when the parcel terminal is not in active use, the parcel containers may be rearranged automatically with the main boom and loader according to the heights of the parcels on them, thus creating more vacant space for optimal use of the space inside the parcel terminal.

A code generated for a parcel terminal user may be a key meant for single use which connects the user, the parcel and parcel data. In an embodiment, according to the data contained in the code, the parcel may be delivered to the user upon scanning the code at the parcel terminal and touch-free; i.e. the user may not have to touch the parcel terminal to start the transaction upon reaching the parcel terminal, the user may receive the parcel touch-free. If the generated code contains information about several parcels, the parcel terminal may deliver them to the user one at a time, one after another. The code may be generated for the user prior to sending the parcel in a smart device application or in a web application. The code for the parcel recipient may be generated and forwarded automatically by the server as soon as the parcel terminal has sent the data concerning the loaded parcel to the server.

The user may enter, in the user interface of the parcel terminal, a choice of loading or receive a parcel or parcels. The main boom with the loader may moves to the console and the console door opens. A parcel container is pushed in front of the user with the loader for loading or receiving a parcel. When, upon sending a parcel, the parcel in question does not have a previously added code, a pre-printed sticker with a code including parcel data may be added to the parcel by the user or, in an alternative embodiment, the printer in the parcel terminal console may print a sticker with a code including parcel data that is added to the parcel by the user.

The user then scans the code on the parcel that contains parcel data, and places the parcel in the parcel container in the console. Based on the scanned data, the parcel terminal identifies that a parcel is going to be loaded and an empty parcel container is brought to the console for loading the parcel.

Next automatic identification may be carried out inside the parcel terminal to determine, e.g., if the parcel has been placed properly on the parcel container and if the parcel exceeds the width or length limits of the terminal. The identification of the parcel on the parcel container may be carried out by taking a picture of the parcel with the camera inside the console. The identification of the width and length of the parcel may be carried out by reflective markers and two cameras or, in an alternative solution by sensors, or by sensors and mirrors. The obtained data may be processed by relevant software to determine the height and width of the parcel, to compare those dimensions to the requirements of the terminal, and to determine if the parcel is placed properly.

Upon loading a parcel that exceeds terminal requirements, the user interface may announce the oversized parcel to the person who loaded it by showing, on the screen of the user interface, the picture where the parcel goes over the reflective markers, and the person loading the parcel may then adjust the position of the parcel or, in the case of a bigger parcel, when it does not fit within the reflective markers, the parcel may be taken out and repacked if necessary. This system may prevent loose parts of the parcel from being caught between the main boom or loader mechanisms while transporting the parcel from the console to the shelf, which may hinder the working process of parcel terminal.

As an alternative for identifying an oversized parcel, the terminal may include measuring sensors installed into every corner of the parcel container that identify the oversized parcel when the parcel cuts the ray from the measuring sensor. Another alternative solution may use, instead of two measuring sensors, mirrors placed at a specific relevant angle to send the ray from one measuring sensor to another.

Taking pictures may enable, in addition to measuring, identification of the condition of the parcels when they are loaded in and delivered from the parcel terminal.

Next, the height of the parcel placed on the parcel container may be measured in the terminal. The height of the parcel may be used to determine a suitable place for the parcel on the shelves of the terminal where it will be stored. This suitable place for a parcel may be found on the shelf by comparing the heights of the vacant spaces on the shelves and the number of rails in them per one vacant spatial unit to the height of the parcel placed in the parcel container. The parcel container with the parcel base may be placed into such a space on the shelf—e.g., underneath an upper parcel container so as to be in the uppermost available shelf—so that the relevant capacity of the space may be used to the maximum.

The presence of the user at the console may be recognized by a motion sensor. A console door at the height of the screen may then be opened and a scanner may be activated. The user may be identified by scanning a previously generated unique single-use code, such as QR-code a bar code, a combination of numbers/letters, etc., with the scanner.

While approaching the parcel terminal, the motion sensor may identify a user at the parcel terminal and the console door is opened to reveal the user interface and the scanner is activated. The user scans the code containing their parcel data. The parcel terminal identifies from the code the transaction where the parcel must be delivered and brings, with the boom and loader, to the console the parcel meant for the user. The door is fully opened and the user can take their parcel out. After the user removes the parcel the door closes.

Referring to the figures, wherein like numerals refer to the same or similar components in the various views, FIGS. 1a to 1c depict different alternative parcel terminal body solutions in accordance with the present disclosure, in the cases of an octagonal (FIG. 1a), cylindrical (FIG. 1b), and hexadecagonal (FIG. 1c) housing. Any of these shapes, or any other appropriate polygonal or other shape, may be used for the body of the parcel terminal.

Figure 2:
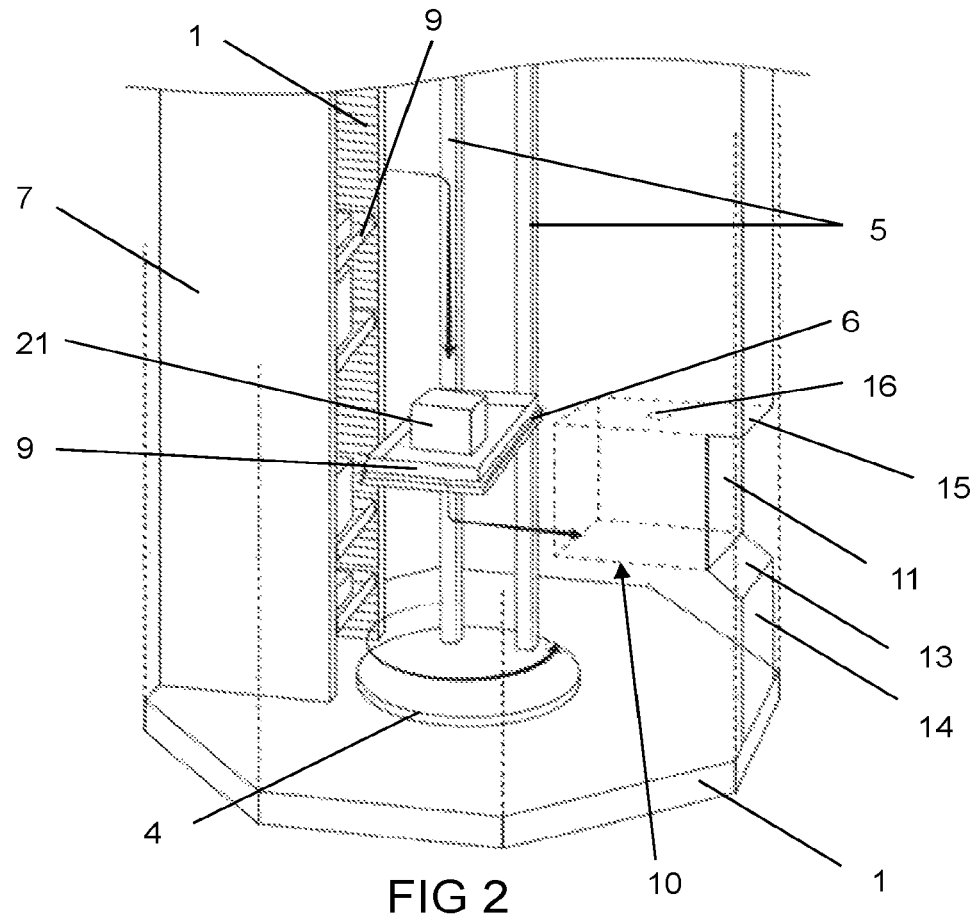
FIG. 2 is a diagrammatic illustration of an example working principle of a parcel terminal in accordance with the present disclosure.

FIG. 2 depicts an example tower-shaped body of a portable parcel terminal. The example terminal includes a base frame 1, roof frame 2, side panels 3, a main boom 5 with a loader 6 fastened to a rotating base 4 that has been added to the base frame 1. The example terminal further includes a circular set-up of a multitude of shelves 7 arranged in a plurality of shelving racks, the shelves comprising rails 8 around the rotating base. The example terminal further includes a plurality of removable parcel containers 9 that are placed on the shelf rails 8 and allow rearrangement on rails, and a console 10.

In an embodiment, the console 10 includes a parcel container base 9.1 added to the lower part of the console, a console opening 11, a console door 12, a user interface 13, a scanner 14, a motion sensor 15 attached outside to the wall, a parcel position photographing camera 16 added into the upper part of the console, measuring light curtains 17 added to the rear section, weighing elements 18, at least one measuring device, attached into at least one corner, reflective markers 20 added to the inside walls of the console. In embodiments the measuring device is one or more measuring cameras 19.1, measuring sensors 19.2 or mirrors 19.3.

The parcel terminal may be connected to a server in order to process data, generate user and parcel codes and for identifying users with the web application or smart device application, as well as sending data to the parcel terminal.

After or while scanning a parcel code with the scanner 14, the boom 5 and the loader 6 may bring a parcel container 9 from the rails 8 of the shelves 7 with a parcel 21 in it, and take it to the console front 10 for the user. The terminal may then open the door 11. The main boom 5 moves the loader 6 to left and right according to the predetermined degrees, for example up to 315 degrees both ways in the preferred solution. That allows fast and efficient retrieval of parcels from the shelves, and placing parcels onto the shelves.

Figure 11:
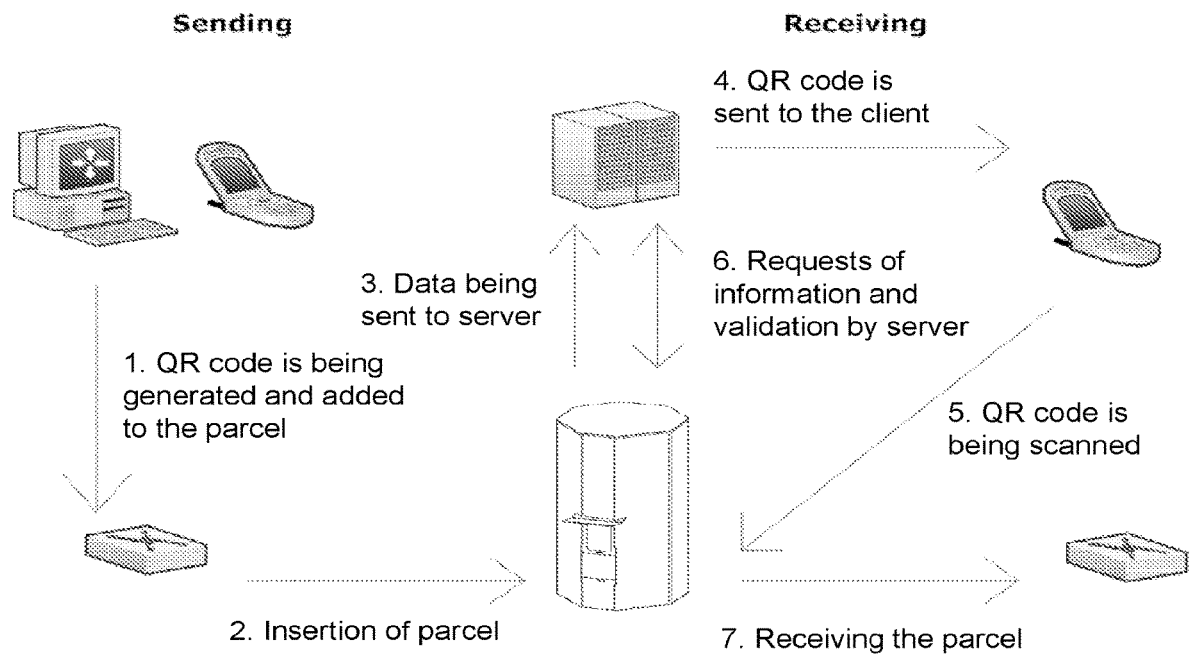
FIG. 11 is a diagrammatic depiction of a method of operation of a parcel terminal in accordance with the present disclosure.
Figure 12:
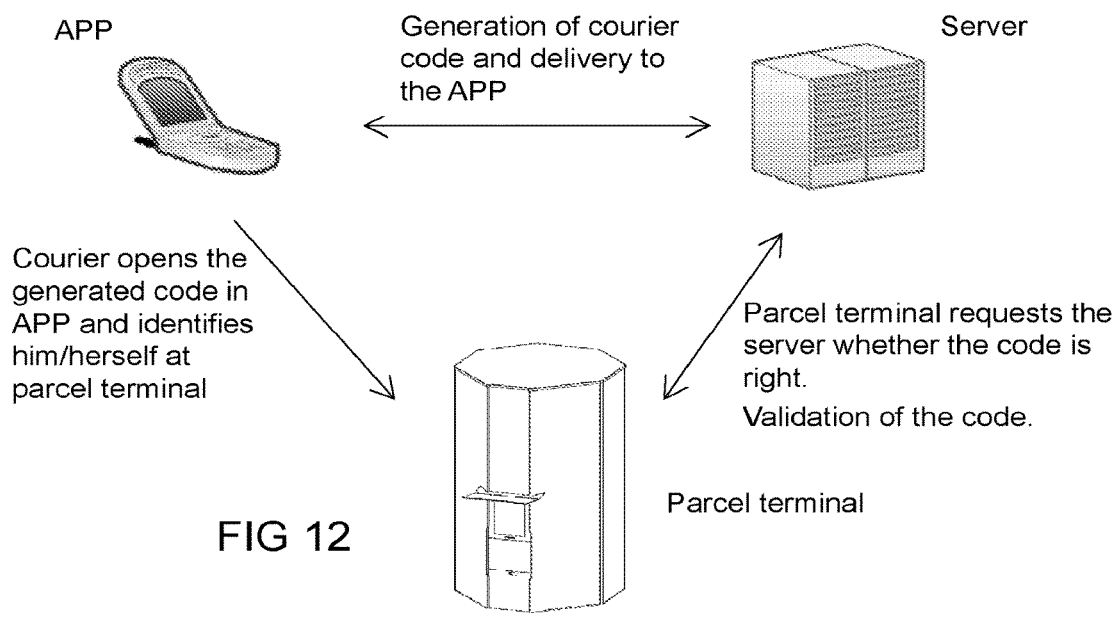
FIG. 12 is a diagrammatic depiction of a method of operation of a parcel terminal in accordance with the present disclosure.

FIGS. 11 and 12 depict different aspects of an example method that may generally be used to operate the parcel terminal. The method may include the following steps, in an embodiment:

Generation of the user code and parcel code by a user at a user computing device in communication with a server (communication lines not shown in FIG. 11). The user code and parcel code may be in the format of a QR-code, a bar code, or some other type of unique single-use code.

Figure 4A:
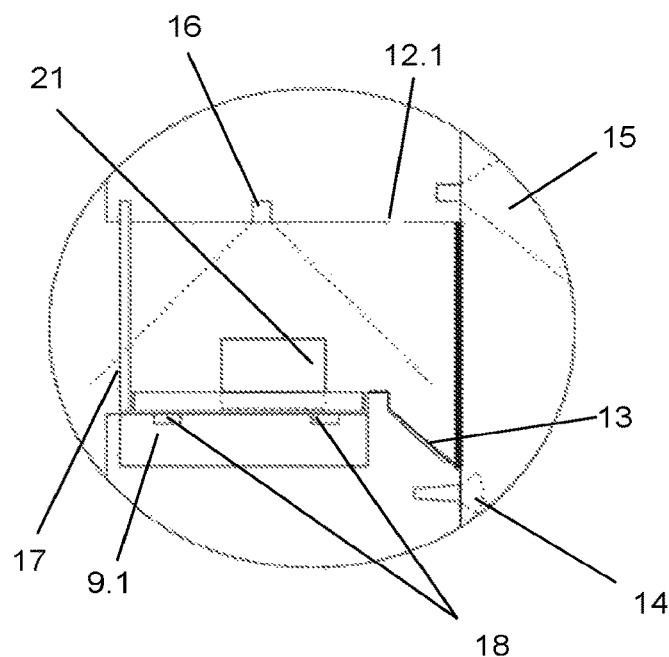
FIGS. 4a, 4b, and 4c are diagrammatic illustrations of different positions of an example console door of a parcel terminal in accordance with the present disclosure.

Initiation of the session of loading and/or delivery of the parcel at the terminal. In order to initiate a session, user identification is carried out at the parcel terminal. The motion sensor 15 mounted on the panel of the parcel terminal is used to identify the user. The motion sensor senses the user as soon as the user has moved into the motion sensor's coverage area 15.1. The terminal door 12 remains closed at this time, as shown in FIG. 4a.

Figure 4B:
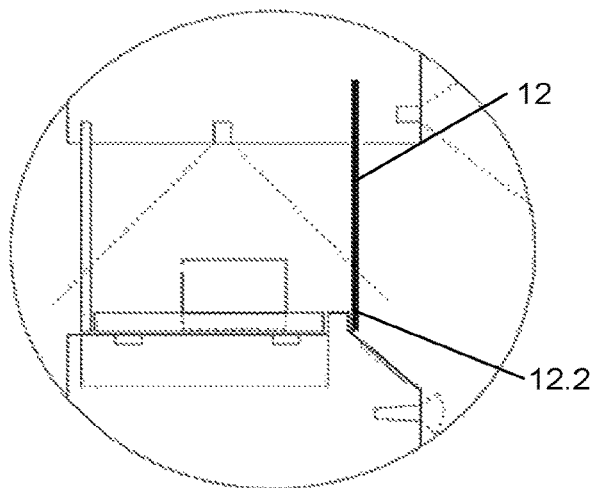

Opening of the parcel terminal console door 12 to reveal the user interface 13, wherein the position 12.2 of door 12 is shown in FIG. 4b.

Activation of the scanner 14 and user interface 13.

Upon scanning the code by the user, the user is identified and the scanned code is sent to the server.

Validation of the scanned code at the server.

Sending the command by the server to the terminal to receive and load the parcel 21 associated with the code (if the user is attempting to store the parcel) or to deliver the parcel 21 (if the user is attempting to retrieve the parcel).

Figure 4C:
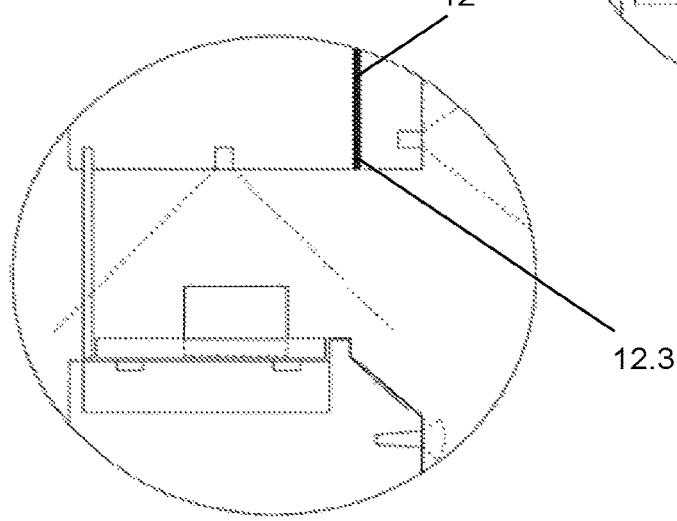

Full opening of the console door 12, wherein the position 12.3 of the door 12 is shown in FIG. 4c.

Figure 8A:
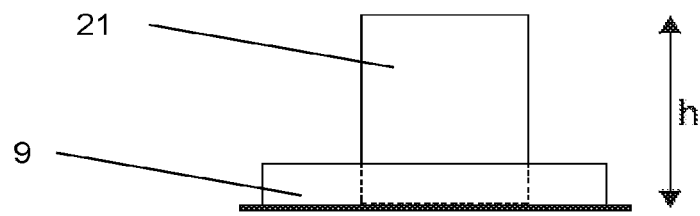
FIGS. 8a, 8b, and 8c are diagrammatic depictions of an example shelving rack that may be provided in a parcel terminal in accordance with the present disclosure.

Performing the parcel loading or delivery transactions. To load the parcel, the availability and location of a vacant space in the parcel terminal is checked, the parcel 21 that was placed in the parcel container 9 is measured, the parcel's position in the parcel container is specified, the parcel is weighed and, according to the received data, the most suitable place for the parcel is found on the shelves 7. Upon measuring the parcel, the parcel's height is measured. In the case when the height h (see FIG. 8a) of the parcel 21 corresponds to no vacant spaces in the parcel terminal, the parcel containers in the parcel terminal are rearranged on the rails 8 of the shelves 7 in a way that a vacant space corresponding to the height h of the parcel could be made on a shelf.

Completion of the parcel loading or delivery session, the door will be closed fully and the scanner as well as the user interface are deactivated.

The parcel terminal may include computing hardware for carrying out the above-noted functionality of FIGS. 11 and 12 and other functions, processes, steps, etc. of this disclosure. In an embodiment, the parcel terminal may include a first computing device, such as a general purpose computer having a computer-readable memory with instructions and a processor executing those instructions, that provides the user interface 13, effects communications with the server, and initiates commands to move the boom 5, loader 6, and other mechanical components of the terminal. The parcel terminal may further include a second computing device that controls movement of the boom 5, loader 6, and other mechanical components. The second computing device may receive movement commands from the first processing device and transmit movement instructions to the mechanical components. The second computing device may be a programmable logic controller (PLC), in an embodiment. The second computing device may also control opening and closing of the console door 12, in an embodiment, responsive to input from the motion sensor 15, scanner 14, and/or first computing device. It should be noted that, although specific computing hardware is noted above for the first and second computing devices, any type of appropriate computing hardware may be used for any computing device in the parcel terminal, including but not limited to a general-purpose computer, a PLC, another programmable logic device (PLD), an application-specific integrated circuit (ASIC), etc. Further, it should be noted that functions, processes, steps, etc. of this disclosure that are carried out by such computing devices may be embodied in any combination of software, digital hardware, and analog hardware. Still further, although two computing devices are explicitly described above, it should be appreciated that the functions, processes, steps, etc. of this disclosure may be carried out by a single computing device, by two computing devices, or by more than two computing devices of the parcel terminal.

Figure 3A:
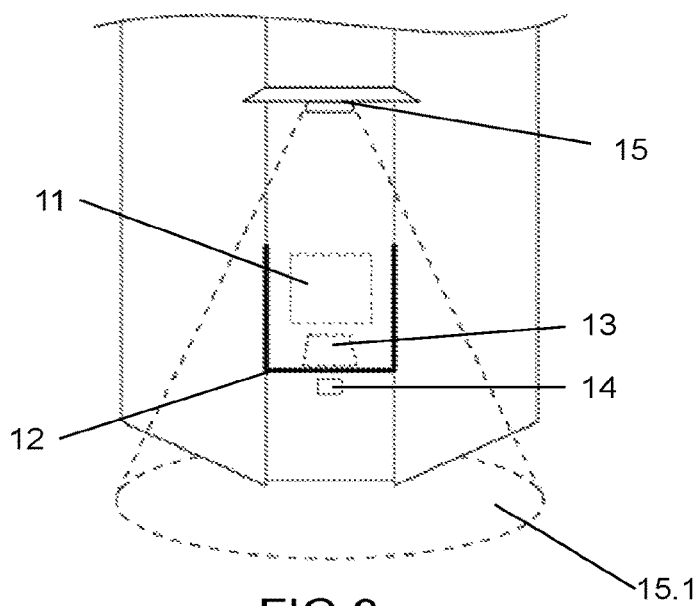
FIGS. 3a, 3b, and 3c depict an example identification of the presence of a user of a parcel terminal according to the present disclosure.
Figure 3B:
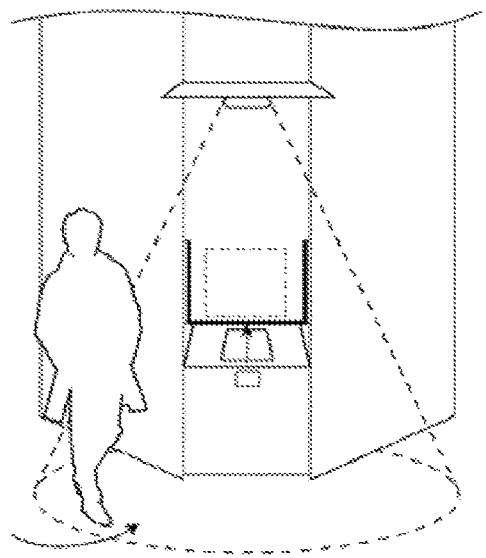
Figure 3C:
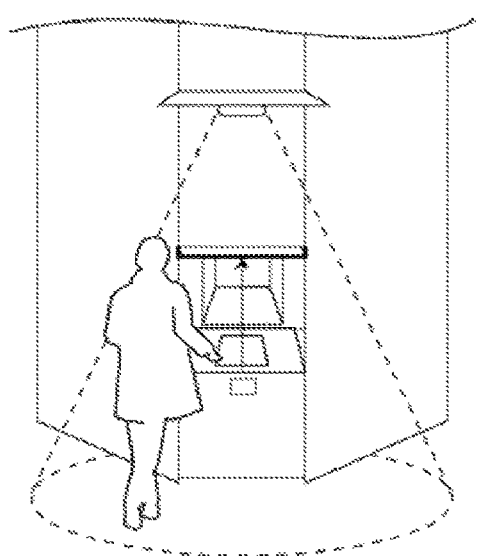

FIGS. 3a to 3c depict the identification of the presence of a parcel terminal user with a motion sensor 15, which senses when a user moves into the coverage area 15.1 of the motion sensor 15. When the user moves into the motions sensor's coverage area 15.1, the console door 12 is opened to reveal the user interface 13. Opening the door activates the scanner 14 and the user code is scanned. If the code is for delivering a parcel, the corresponding parcel will be brought, with the main boom 5 and loader 6, to the console 10 and the console 10 door 12 will open fully. The parcel 21 is delivered and the door 12 is brought to its closed position.

The console 10 diagram of the parcel terminal and the different positions of the console door are depicted in FIGS. 4a to 4c. In FIG. 4a the console door 12 is in closed position, in figure FIG. 4b the door 12 is open partially to reveal the user interface 13 and has partially moved through the slot 12.1 in the upper part of the console and in FIG. 4c the console door 12 is in its fully open position, having been guided through the door moving slot 12.1.

Figure 5A:
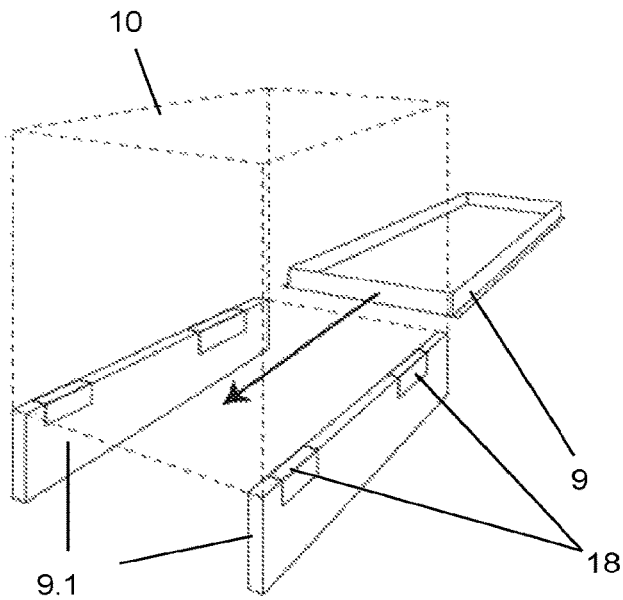
FIGS. 5a and 5b are diagrammatic illustrations of an example parcel weighing system that may be provided in a parcel terminal in accordance with the present disclosure.
Figure 5B:
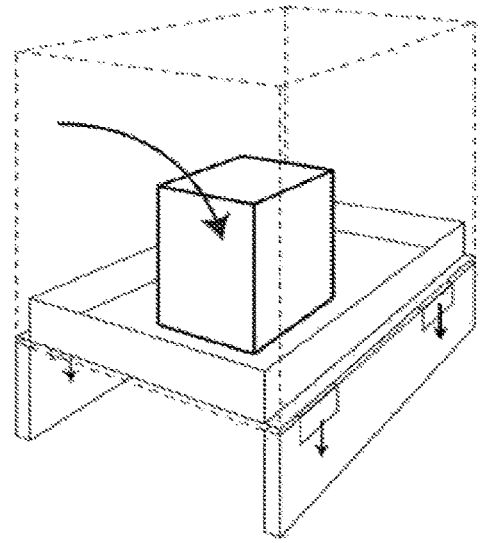

FIG. 5a and FIG. 5b depict an example parcel 21 weighing process in the console 10. Upon placing the parcel 21 into the parcel container 9, weighing may be carried out to determine the movement speed for the main boom 5 and loader 6. In the case where the weight of the parcel 21 exceeds a selected weight (for example, over 15 kg), a slower speed will be determined for the boom 5 and loader 6 to guarantee that the parcel 21 remains in the parcel container 9. In order to weigh the parcel 21, the base 9.1 of the parcel container 9 in the lower part of the console 10 may include weighing elements 18. Upon placing the parcel container 9 onto the weighing elements 18 by the loader 6, the weight is initialized to zero. After loading the parcel 21 on the parcel container 9, the parcel 21 is weighed and the data sent to the user interface, and the movement speed for the main boom 5 and loader 6 is determined according to the weight of the parcel 21.

The upper camera 16 of the console may photograph the state and position of the parcel in order to show the user how the parcel is positioned in the parcel container, and how the parcel must be adjusted if the parcel goes, at some places, over the borders set with reflective marker-lines 20, and in order to identify what parcel was placed in the parcel container 9 and how; and to record the condition of the parcel at delivery. In the case when the parcel has been placed in the parcel container inappropriately, the user interface 13 may display for the user a picture taken of the position of the parcel together with a warning sign and instructions how to adjust the position of the parcel. The picture of the parcel photographed may be displayed in the user interface 13 together with its weight and measuring data.

Figure 6A:
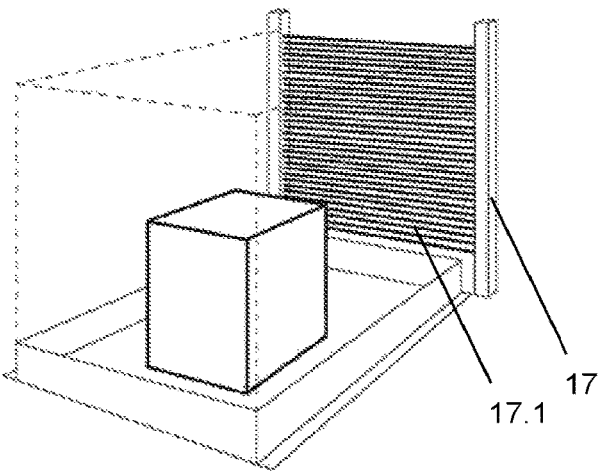
FIGS. 6a to 6d are diagrammatic illustrations of an example parcel height measurement system that may be provided in a parcel terminal in accordance with the present disclosure.
Figure 6C:
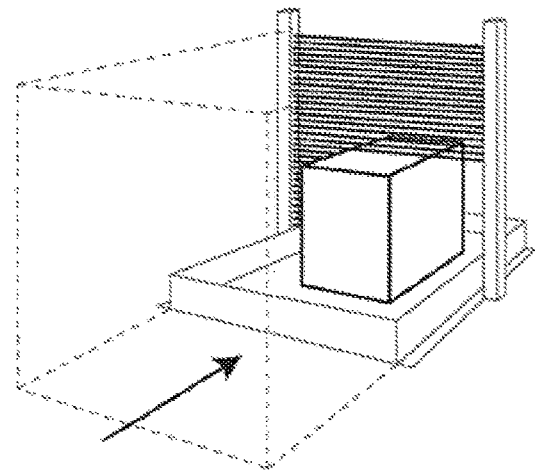
Figure 6B:
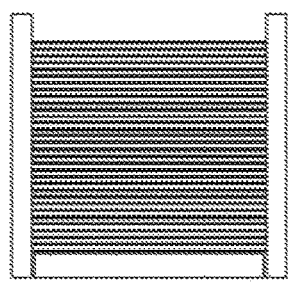
Figure 6D:
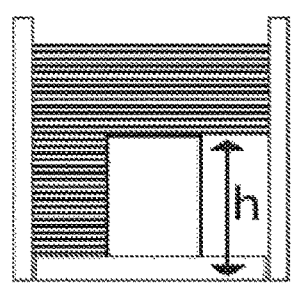

Next, the height of the parcel placed in the parcel container may be measured in the parcel terminal, which is depicted in FIGS. 6a and 6b. Measuring the height of the parcel may be performed upon placing the parcel 21 in the parcel container 9 in the console 10. After the confirmation that a parcel has been placed in the console, the console door 12 closes and the parcel container 9 is pulled, with a magnetic mechanism or a mechanical mechanism, for example, onto the loader 6 through measuring light curtains 17 and the parcel 21 placed in the parcel container cuts the measuring rays at the height of h. Each measuring ray 17.1 has a defined height value and as a result the height h of the parcel 21 is calculated. According to the height of the parcel, a number of shelves needed to accommodate the parcel is calculated, and a place on the shelves is determined, and it is specified where the parcel of such height would fit the best—after measuring the parcel, a computing device of the terminal calculates the most optimal space on the shelves.

Figures 8B, 8C:
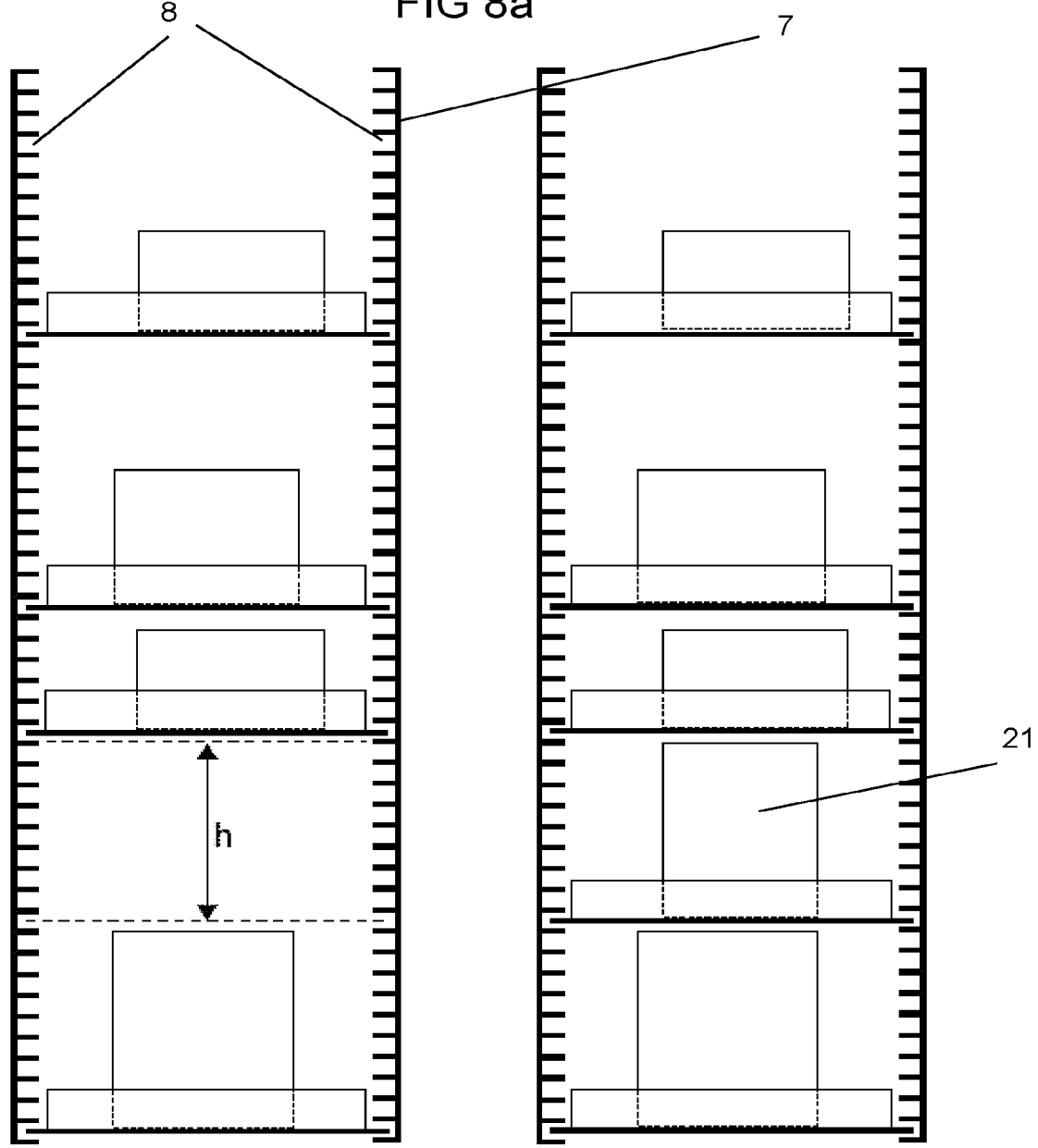

While measuring the height of the parcel, the data (i.e., the height of the parcel and the space associated with available sets of shelves) are analyzed and a vacant space where the parcel can be accommodated is determined. Once the specific shelf on which the parcel is to be placed is determined, the parcel is transported to a vacant area and placed on the shelf 7 to the respective rails 8 that are depicted in figures FIG. 8a to FIG. 8c.

Measuring light curtains send information to the computer where the calculation of vacant spaces on the shelves in the parcel terminal is performed, as well as the comparison with the height of the parcel. Each shelf is checked for the capacity to accommodate the parcel. If, for example, the parcel is four rail-spans high and the shelf has vacant rails 1-10, then the rails 7-10 are eliminated because that parcel will not fit in there and the parcel is not placed on the rails 1-6 because this is not the most optimal space. In such a case the shelf and location with the best-fitting vacant space from among the rest of the vacant rails on shelves is calculated in order to place the parcel there.

The shelves 7 on a shelving rack of the parcel terminal may be separated by respective predetermined distances, which distances may be known to a computing device of the terminal. Based on the known predetermined distances, the computing device of the terminal may calculate the number of shelves needed to store a given parcel, and may determine if available shelves in the terminal are sufficient to fit a given parcel. In embodiments, shelves may be evenly separated—i.e., the respective distances between shelves on a given shelving rack may all be the same as each other. In embodiments in which the terminal includes multiple shelving racks, shelves within a given rack may be evenly-spaced, and the spacing between shelves may be the same for two different racks, or may be different for two different racks.

In embodiments, the respective distances between shelves may be defined by the respective distances between rails 8 that define each shelf. The distances between shelves, whether those distances are all equal or otherwise, may be selected in the design of the terminal so that the height of each shelf is less than the height of the parcel container, in an embodiment. Such an arrangement may allow for great flexibility in the arrangement of parcel containers and parcels on the shelves.

FIGS. 9a to 9d depict the display picture of an oversized and inappropriately placed parcel for the user. FIG. 9a depicts a parcel 21 that has been placed properly in the parcel terminal 9, and the respective picture to be displayed for the user in the user interface is depicted in FIG. 9b. FIG. 9c depicts a parcel in the parcel container, bigger than the allowed limits and improperly placed; and its respective picture displayed in the user interface is depicted in FIG. 9d.

In an embodiment the oversized parcel may be identified by two cameras. A parcel is placed in the parcel container 9. The person wanting to load the parcel selects the command in the user interface 13 and then the cameras 19.1 (A and B) take a picture. In the case when the parcel 21 is oversized or inappropriately placed in the parcel container 9, the reflective markers 20 get cut by the parcel. The system checks the cut reflective marker lines 20 and when this has occurred, the respective information is displayed in the user interface screen so that the user loading the parcel could adjust the parcel 21 or remove it from the parcel container 9.

Figure 7A:
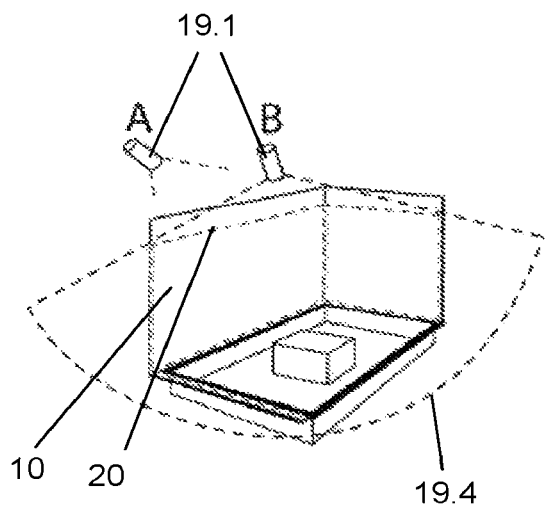
FIGS. 7a to 7f are diagrammatic depictions of an example parcel position and width measurement system that may be provided in a parcel terminal in accordance with the present disclosure.
Figure 7B:
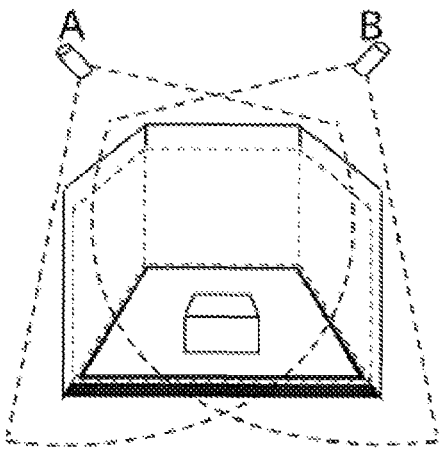
Figure 7C:
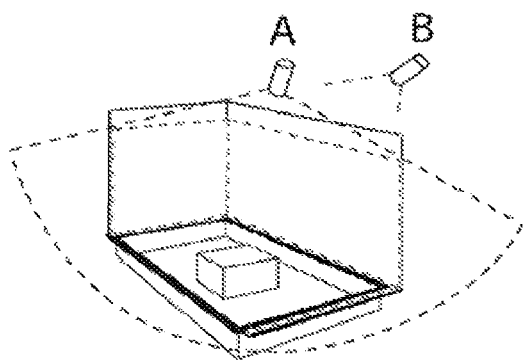
Figure 7D:
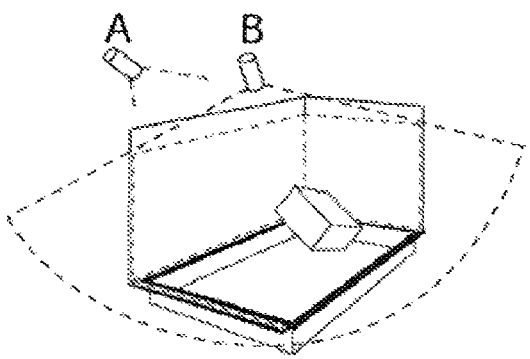
Figure 7E:
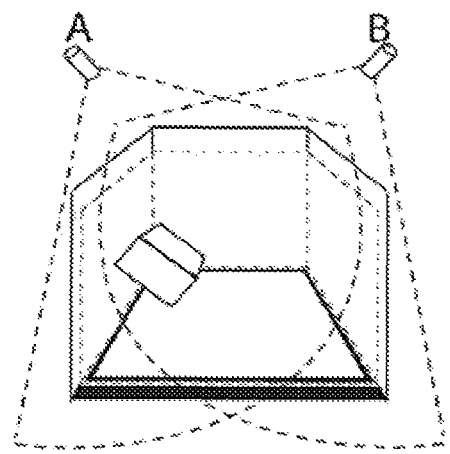
Figure 7F:
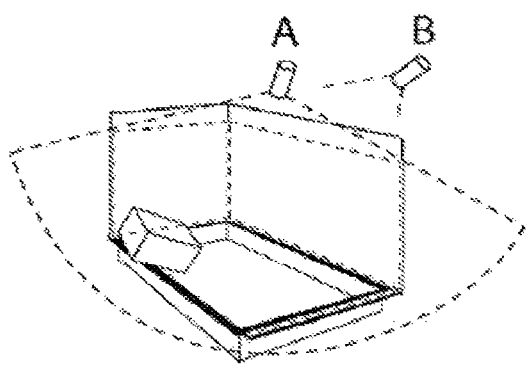

FIGS. 7d to 7f depict how an oversized or inappropriately placed parcel is cutting the reflective marker line. FIGS. 7a to 7c depict a properly-placed parcel.

In FIGS. 7a to 7f, the console cameras 19.1 (cameras A and B) have been installed into both upper front corners of the console when viewed from in front of the console. It is necessary to use at least two cameras in order to guarantee a sufficient photographing area 19.4 and for checking the borderlines of the reflective markers 20 set on the sides. After taking pictures of the parcel placed in the parcel container with cameras A and B, the pictures are sent to the server where the pictures taken of the parcel are compared with the control picture where a parcel is properly placed.

In embodiments, the inappropriate position or measures of the parcel in the parcel container may be determined with, for example, 4 pairs of measuring sensors (for example optical measuring sensors), 2 pairs of measuring sensors (for example optical measuring sensors) or mirrors and two cameras.

Figure 10A:
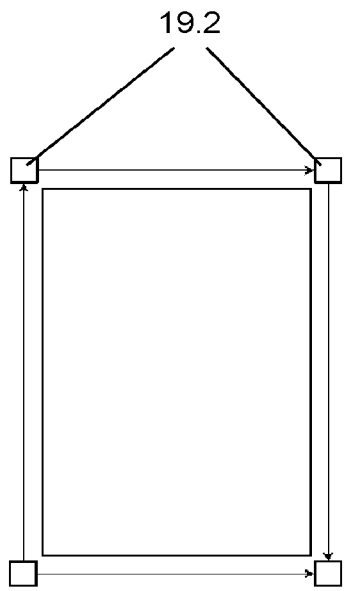
FIGS. 10a, 10b, and 10c are diagrammatic depictions of an example system for recognizing an oversized or improperly placed parcel that may be provided in a parcel terminal in accordance with the present disclosure.
Figure 10B:
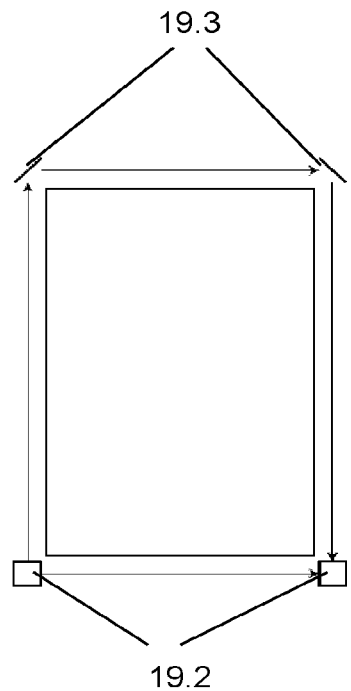
Figure 10C:
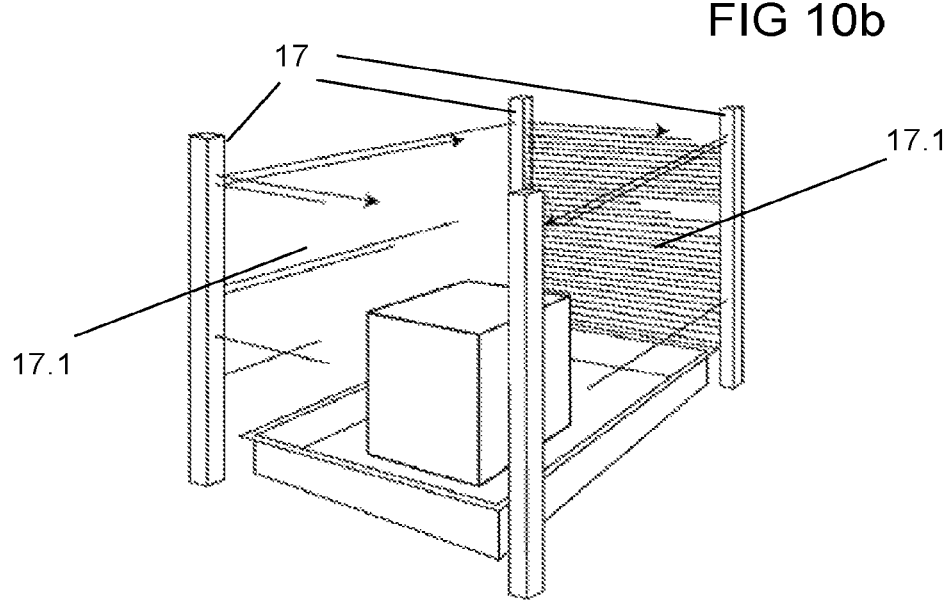

Identifying an oversized parcel with the help of measuring sensors 19.2 and/or mirrors 19.3 is depicted in FIGS. 10a to 10c. After placing the parcel 21 into the parcel container 9, if the parcel cuts the rays of measuring sensors 19.2, it is announced to the user in the user interface 13, so that the position of the parcel 21 must be adjusted or the parcel removed from the parcel container 9 if it is oversized.

The number of measuring sensors 19.2 may be decreased with the help of mirrors 19.3 in an embodiment and in such a case the movement of rays from one measuring sensor 19.2 is reflected with the help of mirrors 19.3 to another measuring sensor 19.2.

FIGS. 9a to 9d illustrate an example process by which a picture of an oversized or inappropriately placed parcel may be captured and displayed for the user. After the parcel 21 is loaded in the parcel container 9, a picture is taken with a camera 15. If the parcel identification cameras 19.1 (cameras A and B) have identified an oversized or inappropriately placed parcel, a warning is displayed on the screen specifying the reflective marker line 20 that the parcel 21 is cutting. The user may then adjust the parcel's position in the parcel container or takes the parcel out of the parcel container.

FIGS. 13 to 17 are flow charts depicting various embodiments of methods of controlling and interacting with a parcel terminal according to the present disclosure. Each of FIGS. 13 to 17 includes actions by a user and by the parcel terminal. Some action of FIGS. 13 to 17 shown on the wide of the user or the parcel terminal may additionally include actions by a remote server, as will be explained in conjunction with the figures.

Figure 13:
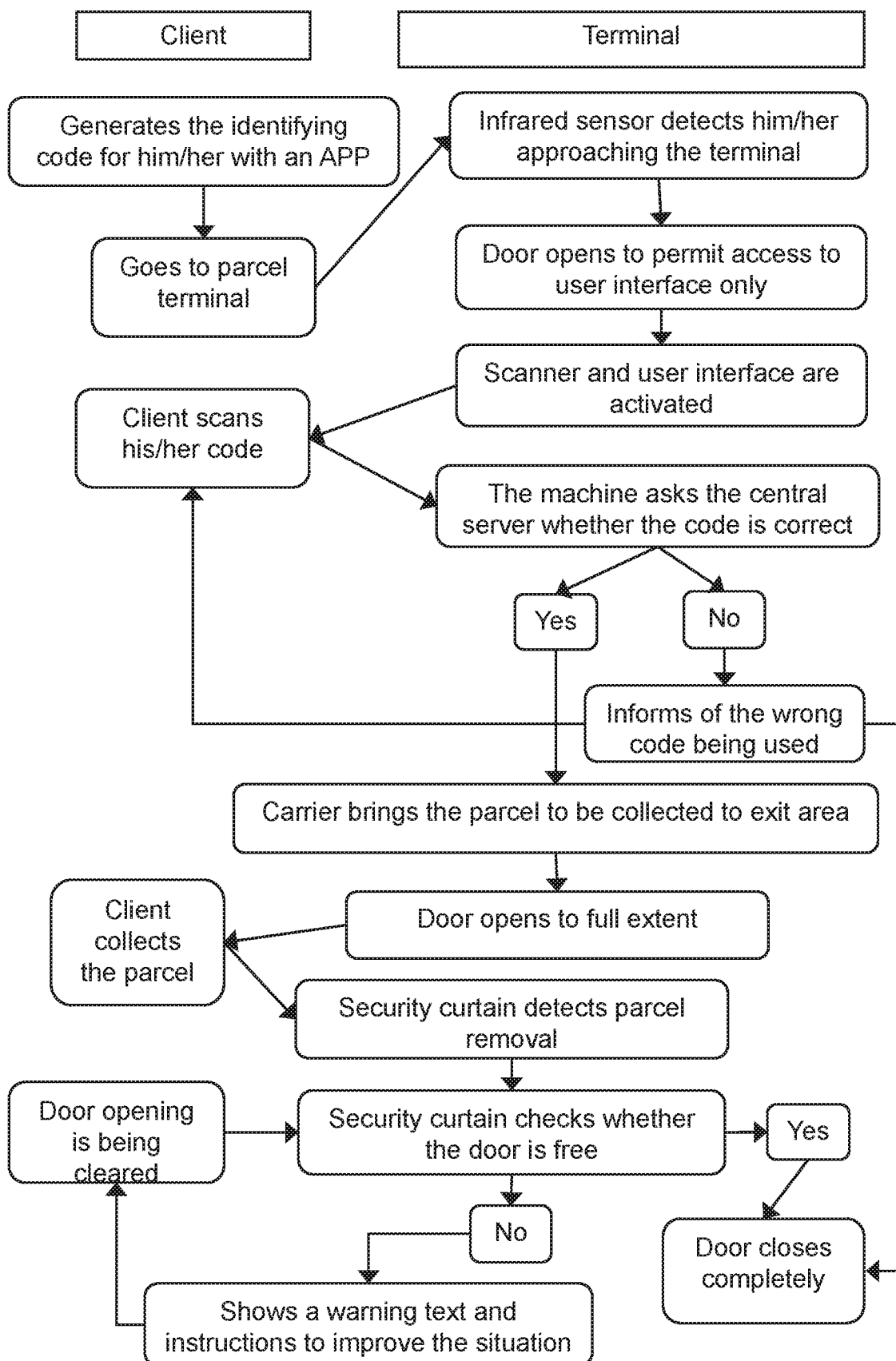
FIG. 13 is a flow chart illustrating an example method by which a parcel terminal in accordance with the present disclosure may receive a parcel from a user.

FIG. 13 depicts an embodiment of a method for retrieving a parcel for a courier by a parcel terminal according to the present disclosure. The method may include the following steps:

Courier generates an identifiable code via an application, which code may be transmitted to the courier's electronic device by a server that is also in communication with the parcel terminal.

Motion sensor 15 senses the courier approaching the parcel terminal.

Parcel terminal console door 12 is opened to reveal the user interface 13 responsive to the motion sensor 15 detecting the user.

The scanner 14 and user interface 13 are activated.

Courier scans the previously generated code with the scanner 14, the parcel terminal forwards the scanned code to the server, and the server returns an identification of the courier.

In the case when the code is wrong or unknown, the terminal announces that the code is wrong and scanning is carried out again and/or the door closes completely and the session is over and the user interface as well as the scanner are deactivated.

If the code is correct, an inquiry is sent to the server to obtain information about parcels associated with the code.

The server returns a list of parcels associated with the code and the list of parcels is displayed in the user interface of the terminal. The courier enters a command to receive all the parcels one after another, or a selection is made to retrieve only some parcels.

The command to deliver a selection of parcels is sent to the system and the boom with the loader bring the parcel or parcels to be delivered, one after another, according to the list, to the console.

Upon delivering the first parcel, the door opens fully.

The parcel delivered to the console is taken out by the courier and the command to retrieve the next parcel is entered.

The system checks if the parcel has been taken out and the door opening is clear.

The check of the door opening to be clear is performed with safety curtains.

In the case when it is identified that the door opening is not clear, a warning and instructions to improve the situation are displayed in the user interface. After this recheck is performed to ensure the door opening is clear.

When the parcel has been taken out and the door opening has been cleared, the door closes to cover the parcel delivery slot and the loader brings the next parcel to be delivered. Then the system checks if the parcel has been taken out and the door opening clear. The check that the door opening is clear is performed with safety curtains. In the case when it is recognized that the door opening is not clear, a warning and instructions to improve the situation are displayed in the user interface. After this recheck is performed to ensure the door opening is clear.

The process is repeated until the parcels in the list have all been delivered.

In order to complete the session, an option is displayed in the user interface to finish the session or to start a new one, either for loading parcels or for receiving parcels.

Upon receiving the command from the courier to finish the session, the door moves to its fully closed position.

If the command by the courier, to finish the session or to start a new session, is not entered during the allocated time (within 10 seconds, for example), the door moves to its fully closed position and the user interface as well as the scanner are deactivated.

Figure 14:
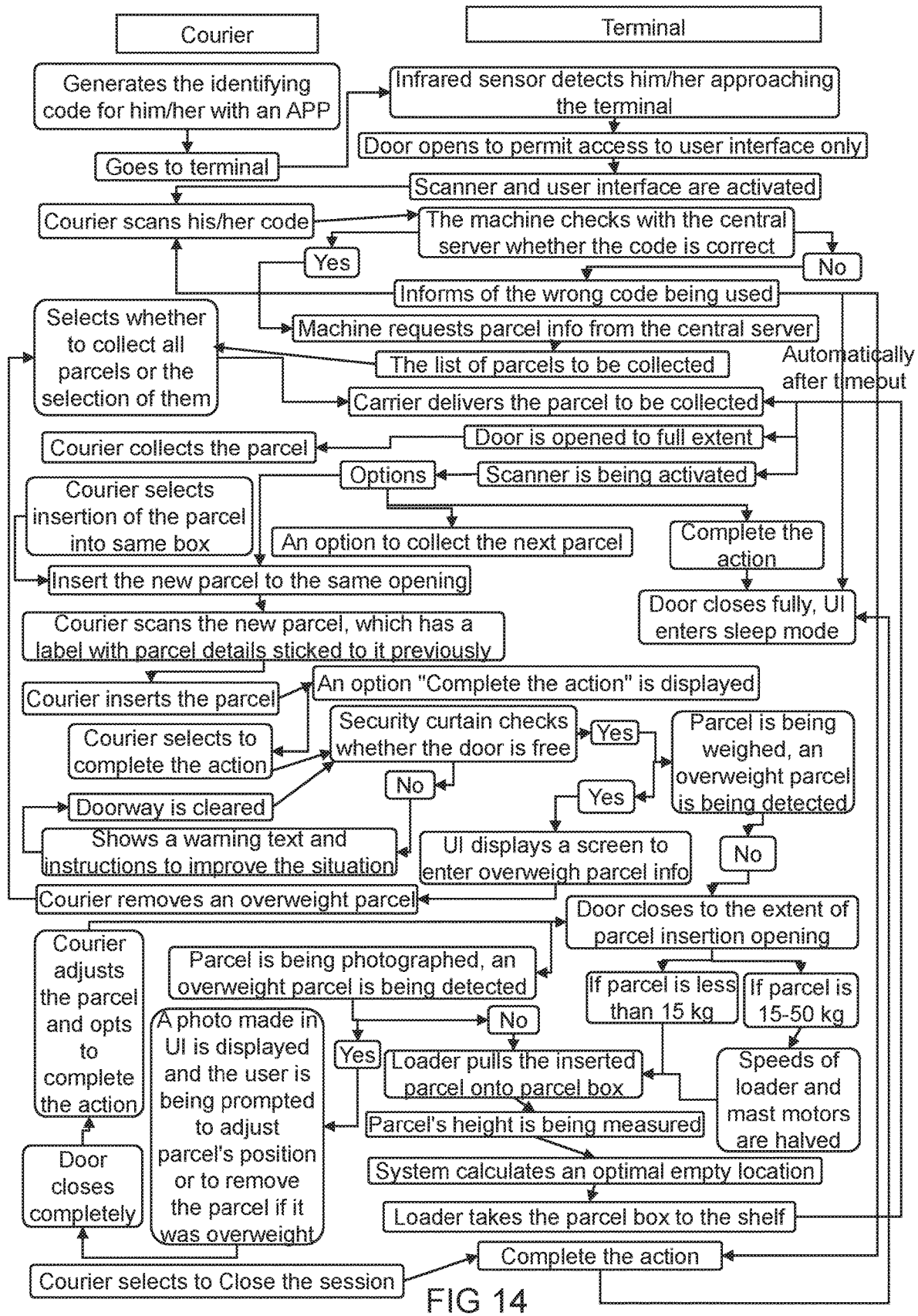
FIG. 14 is a flow chart illustrating an example method by which a parcel terminal in accordance with the present disclosure may receive a parcel from a user.

FIG. 14 depicts an embodiment of a method for retrieving a parcel for a courier by a parcel terminal and for loading a parcel in a terminal provided by a courier. The method may include the following steps:

Courier generates themselves an identifiable code via an application

Motion sensor 15 identifies the courier approaching the parcel terminal which initiates the session.

Parcel terminal console door 12 is opened to reveal the user interface 13.

The scanner 14 and user interface 13 are activated.

Courier scans the previously generated code and the system identifies the person by forwarding the scanned code to the server.

If the code is wrong, announcement is made about using a wrong code and scanning is carried out again and/or the door closes completely and the session is over and the user interface as well as the scanner are deactivated.

If the code is correct, an inquiry is sent to the server to obtain information about parcels.

A list of parcels is issued which is displayed in the user interface. The courier enters a command to receive all the parcels one after another, or a selection is made to retrieve only some parcels.

The command to deliver a selection of parcels is sent to the system and the boom with the loader bring the parcel or parcels to be delivered, one after another, according to the list, to the console.

Upon delivering the first parcel, the door opens fully.

The full opening of the door activates the scanner.

The parcel delivered to the console is taken out by the courier and the command to retrieve the next parcel or to load a new parcel in the same parcel container is entered.

Upon entering the command to load a new parcel, the scanner is activated.

In the case of a command to enter a new parcel, data about the parcel are entered and a code with the parcel data is stucked onto the parcel.

The coded parcel is scanned and loaded in the parcel terminal by placing it into the parcel container.

An option is displayed to complete the transaction.

The courier selects to finish the transaction.

The system checks if the parcel has been taken out and the door opening is clear.

The check of the door opening to be clear is performed with safety curtains. In the case when the system recognizes that the door opening is not clear, a warning and instructions to improve the situation are displayed in the user interface, after which the door opening is cleared.

When the door opening is clear or cleared, the parcel is weighed and checked if the weight of the parcel remains within the allowed limit. In the case when an oversized parcel is identified, information about the oversized parcel to be removed is displayed in the user interface, then the parcel is removed and a new command to finish the transaction, to load a new parcel, to retrieve a new parcel or to end the session is entered.

If the parcel is not oversized, the door closes to cover the parcel delivery slot.

Measuring the parcel is carried out and checking is performed whether the parcel fits within the allowed size limits and has properly been placed in the parcel container.

Picture is taken of the parcel to measure it and check its position in the parcel container.

If it is established that the parcel is oversized, the picture taken and instructions to adjust the position of the parcel are displayed in the user interface, or, if the parcel is oversized, the instructions to remove the parcel from the parcel container. In such a case the door will open fully to allow adjustment or removal of the parcel. After the parcel has been adjusted or taken out, and the command to end the transaction has been entered, the door closes to cover the parcel delivery slot. And again, photographing is performed to check for the position of an oversized or inappropriately placed parcel.

If, upon weighing the parcel, it is established that the parcel meets the weight limits, the parcel container with the parcel placed into it is pulled onto the loader.

If, upon weighing the parcel, it is established that the parcel is lighter (for example, up to 15 kg) than the set limits, the parcel terminal continues in its normal working mode.

If, upon weighing the parcel, it is established that the parcel is heavier (e.g., between 15-50 kg) than the set limits, then the movement speed of the loader and main boom is slowed down according to the weight of the parcel in order to avoid upsetting the parcel during the movement of the loader and boom, or to keep it from falling out of the parcel container.

Upon pulling the parcel onto the loader together with the parcel container, the height of the parcel is measured.

According to the height of the measured parcel, and according to the positions of other parcels as well as the vacant space on the shelves, the most suitable place is calculated for the parcel to be loaded in order to make sure that the parcel to be loaded would take up as little space as possible.

The boom transports the parcel that has been pulled onto the loader together with the parcel container, to the shelf according to the most suitable vacant place found previously.

In order to complete the session, an option is displayed in the user interface to finish the session or to start a new one, either for loading parcels or for delivering parcels.

Upon receiving the command from the courier to finish the session, the door moves to its fully closed position.

If the command by the courier, to finish the session or to start a new session, is not entered during the allocated time (within 10 seconds, for example), the door moves to its fully closed position and the user interface is deactivated.

Figure 15:
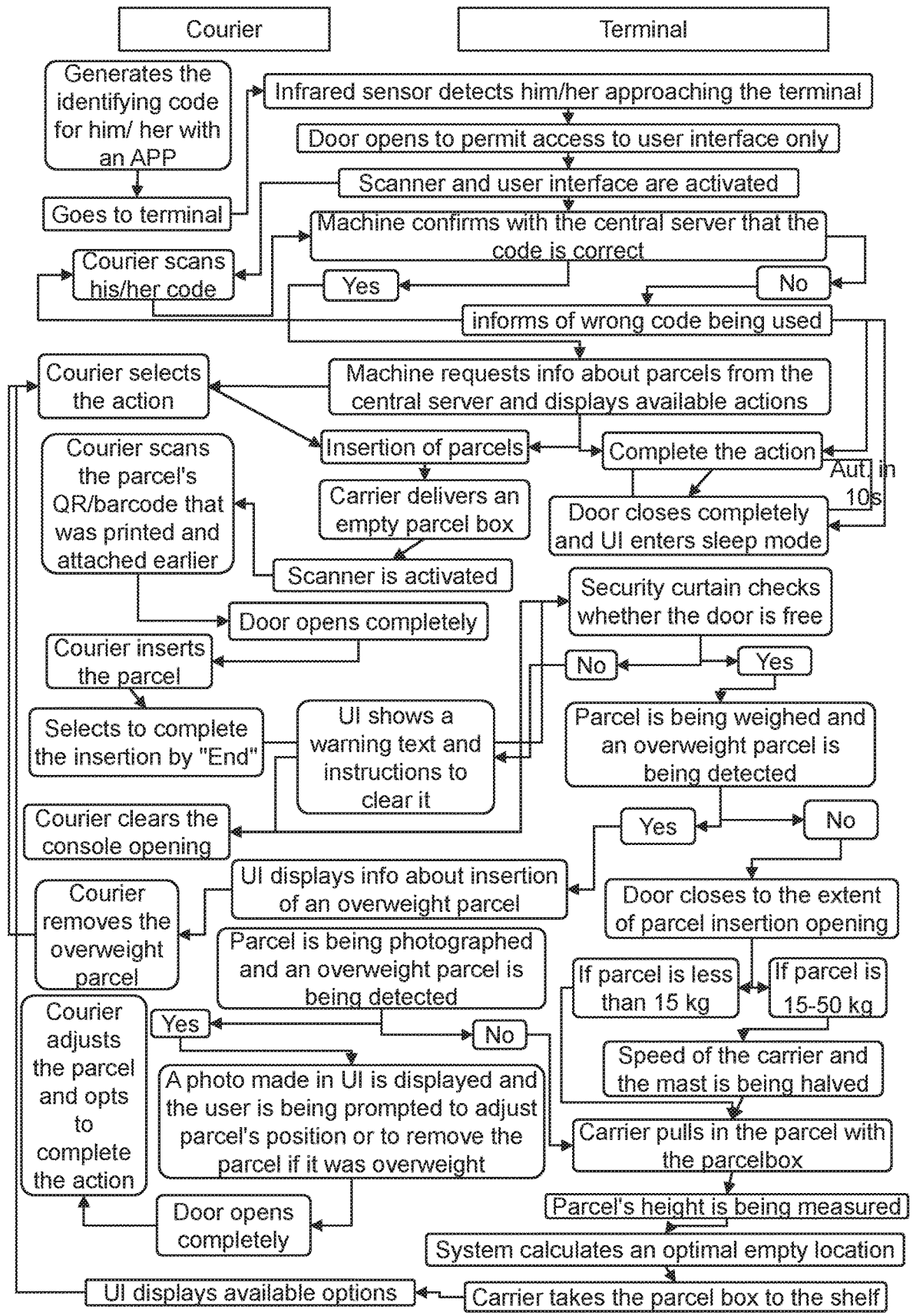
FIG. 15 is a flow chart illustrating an example method by which a parcel terminal in accordance with the present disclosure may receive a parcel from a user.

FIG. 15 depicts an embodiment of a method for loading parcels in a terminal provided by a courier. The method may include the following steps:

Courier generates themselves an identifiable code via an application

Motion sensor 15 identifies the courier approaching the parcel terminal which initiates the session.

Parcel terminal console door 12 is opened to reveal the user interface 13.

The scanner 14 and user interface 13 are activated.

Courier scans the previously generated code and the system identifies the person by forwarding the scanned code to the server.

If the code is wrong, announcement is made about using a wrong code and scanning is carried out again and/or the door closes completely and the session is over and the user interface as well as the scanner are deactivated.

If the code is correct, an inquiry is sent to the server to obtain information about parcels and options are displayed in the user interface.

The courier enters a command to load parcels.

The boom and the loader bring an empty parcel container to the console and scanner is activated.

Upon entering the command to load a new parcel, the parcel data are entered and a code with parcel data is printed and stuck onto the parcel.

The coded parcel is scanned, the door opens fully and the parcel is loaded into the parcel terminal and placed into the empty parcel container in the console.

An option to complete the transaction is displayed

The courier selects to finish parcel loading transaction.

The system checks if the parcel has been loaded and the door opening is clear.

Safety curtains check if the door opening is clear. In the case when the system recognizes that the door opening is not clear, a warning and instructions to improve the situation are displayed in the user interface, after which the door opening is cleared.

When the door opening is clear or cleared, the parcel is weighed and checked if the weight of the parcel remains within the allowed limit. In the case when an oversized parcel is identified, information about the oversized parcel to be removed is displayed in the user interface, then the parcel is removed and a new command to finish the transaction, to load a new parcel, to retrieve a new parcel or to end the session is entered.

If the parcel is not oversized, the door closes to cover the parcel delivery slot.

Measuring the parcel is carried out and checking is performed whether the parcel fits within the allowed size limits and has properly been placed in the parcel container.

Picture is taken of the parcel to measure it and check its position in the parcel container.

If it is established that the parcel is oversized, the picture taken and instructions to adjust the position of the parcel are displayed in the user interface, or, if the parcel is oversized, the instructions to remove the parcel from the parcel container. In such a case the door will open fully to allow adjustment or removal of the parcel. After the parcel has been adjusted or taken out, and the command to end the transaction has been entered, the door closes to cover the parcel delivery slot. And again, photographing is performed to check for the position of an oversized or inappropriately placed parcel.

If, upon weighing the parcel, it is established that the parcel meets the weight limits, the parcel container with the parcel placed into it is pulled onto the loader.

If, upon weighing the parcel, it is established that the parcel is lighter (for example, up to 15 kg) than the set limits, the parcel terminal continues in its normal working mode.

If, upon weighing the parcel, it is established that the parcel is heavier (e.g., between 15-50 kg) than the set limits, then the movement speed of the loader and main boom is slowed down according to the weight of the parcel in order to avoid upsetting the parcel during the movement of the loader and boom, or to keep it from falling out of the parcel container.

Upon pulling the parcel onto the loader together with the parcel container, the height of the parcel is measured.

According to the height of the measured parcel, and according to the positions of other parcels as well as the vacant space on the shelves, the most suitable place is calculated for the parcel to be loaded in order to make sure that the parcel to be loaded would take up as little space as possible.

The boom transports the parcel that has been pulled onto the loader together with the parcel container, to the shelf according to the most suitable vacant place found previously.

In order to complete the session, an option is displayed in the user interface to finish the session or to start a new one, either for loading parcels or for delivering parcels.

Upon receiving the command from the courier to finish the session, the door moves to its fully closed position.

If the command by the courier, to finish the session or to start a new session, is not entered during the allocated time (within 10 seconds, for example), the door moves to its fully closed position and the user interface is deactivated.

Figure 16:
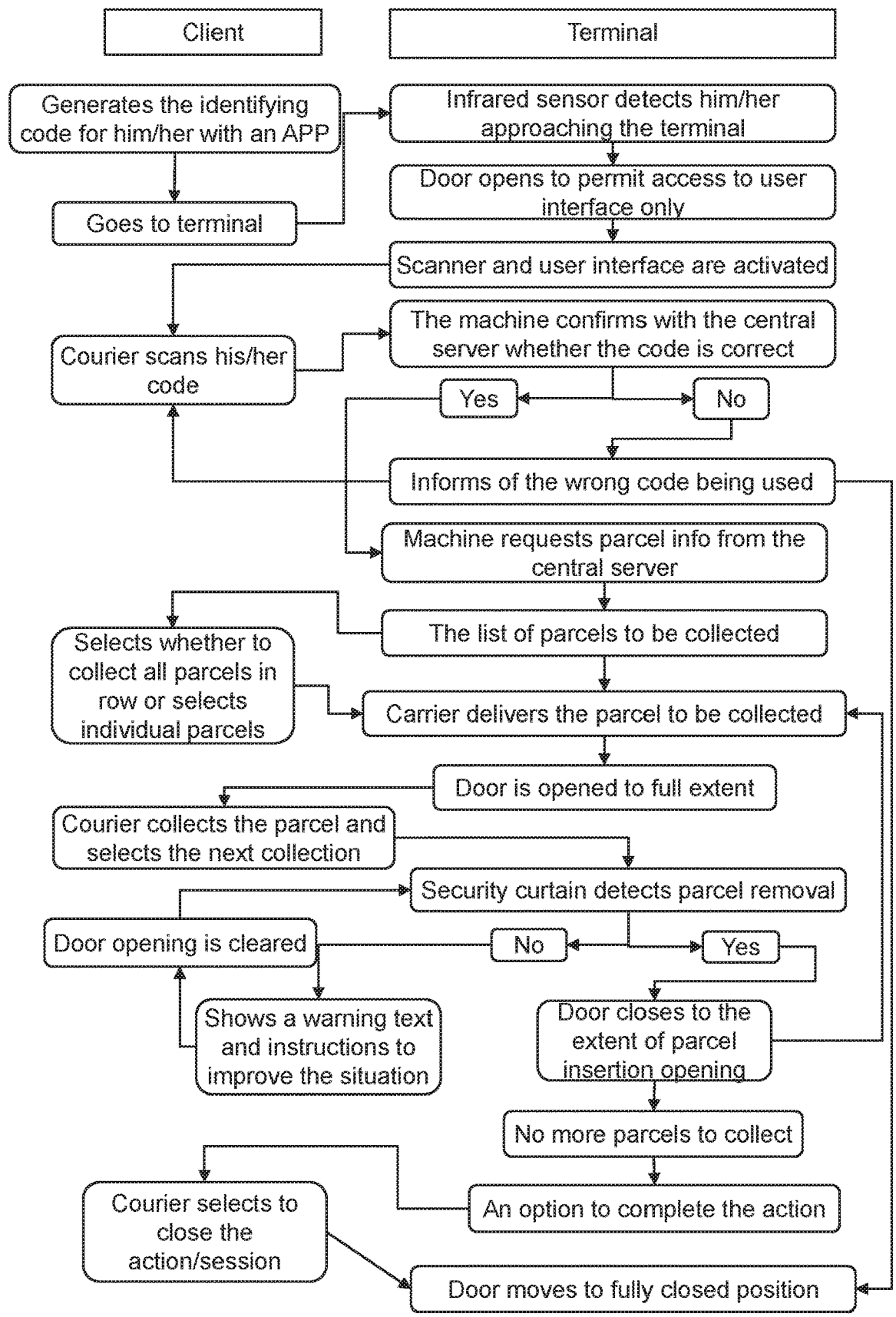
FIG. 16 is a flow chart illustrating an example method by which a parcel terminal in accordance with the present disclosure may retrieve a parcel for a user.

FIG. 16 depicts an embodiment of a method for retrieving parcels for a non-courier user by a parcel terminal. The method may include the following steps:

The person receiving a parcel generates themselves an identifiable code via an application.

Motion sensor 15 identifies a parcel recipient approaching the parcel terminal which initiates the session.

Parcel terminal console door 12 is opened to reveal the user interface 13.

The scanner 14 and user interface 13 are activated.

The person receiving a parcel scans the previously generated code and the system identifies the person by forwarding the scanned code to the server.

If the code is wrong, announcement is made about using a wrong code and scanning is carried out again and/or the door closes completely and the session is over and the user interface as well as the scanner are deactivated.

If the code is correct, a command is sent for delivering a parcel or parcels and the boom with the loader bring the parcel to be delivered, or parcels to be delivered, one after another, according to the list, to the console.

Upon delivering the first parcel, the door opens fully.

The user takes out the parcel brought to the console and

The system checks if the parcel has been taken out and the door opening is clear.

The check of the door opening to be clear is performed with safety curtains. In the case when the system recognizes that the door opening is not clear, a warning and instructions to improve the situation and clear the door opening are displayed in the user interface, after which the door opening is cleared.

When the door opening is clear or cleared, the session is finished and the door moves to its fully closed position.

Figure 17:
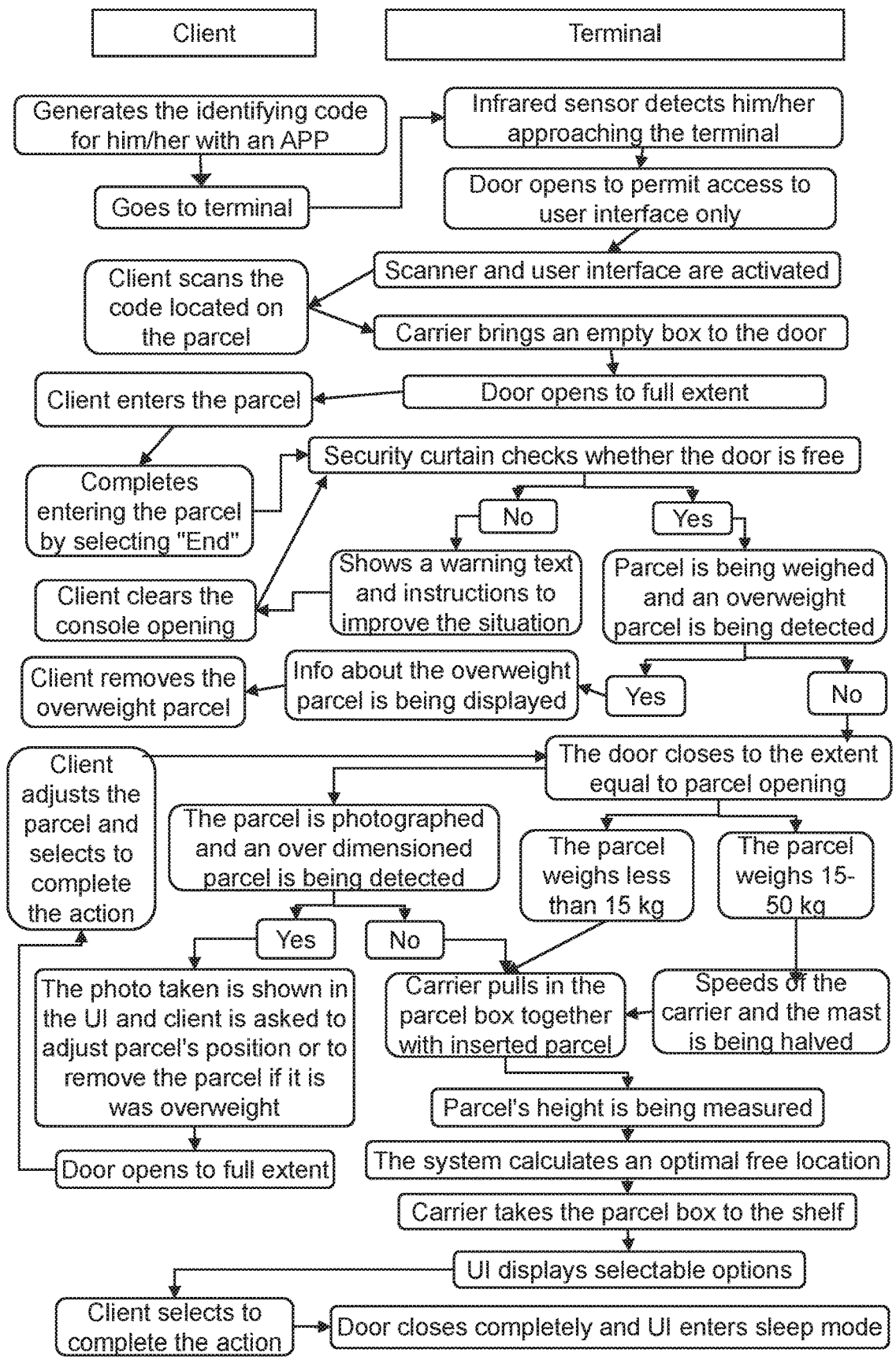
FIG. 17 is a flow chart illustrating an example method by which a parcel terminal in accordance with the present disclosure may receive a parcel from a user and store the parcel in the parcel terminal.

FIG. 17 depicts an embodiment of a method for loading parcels in a terminal provided by a non-courier user. The method may include the following steps:

The sender generates themselves an identifiable code via an application.

Motion sensor 15 identifies the sender approaching the parcel terminal which initiates the session.

Parcel terminal console door 12 is opened to reveal the user interface 13.

The scanner 14 and user interface 13 are activated

The sender scans the code on the parcel.

The main boom and loader bring an empty parcel container into the console.

The door opens fully.

The parcel is loaded and the command to end the transaction is selected.

The system checks if the door opening is clear.

Safety curtains check if the door opening is clear. In the case when the system recognizes that the door opening is not clear, a warning and instructions to improve the situation and clear the door opening are displayed in the user interface, after which the door opening is cleared.

When the door opening is clear or cleared, the parcel is weighed and checked if the weight of the parcel remains within the allowed limit. In the case when an oversized parcel is identified, information about the oversized parcel to be removed is displayed in the user interface, the parcel is then removed and a new command to finish the transaction, to load a new parcel, to retrieve a new parcel or to end the session is entered.

If the parcel is not oversized, the door closes to cover the parcel delivery slot.

Measuring the parcel is carried out and checking is performed whether the parcel fits within the allowed size limits and has properly been placed in the parcel container.

Picture is taken of the parcel to measure it and check its position in the parcel container.

If it is established that the parcel is oversized, the picture taken and instructions to adjust the position of the parcel are displayed in the user interface, or, if the parcel is oversized, the instructions to remove the parcel from the parcel container. In such a case the door will open fully to allow adjustment or removal of the parcel. After the parcel has been adjusted or taken out, and the command to end the transaction has been entered, the door closes to cover the parcel delivery slot. And again, photographing is performed to check for the position of an oversized or inappropriately placed parcel.

If, upon weighing the parcel, it is established that the parcel meets the weight limits, the parcel container with the parcel placed into it is pulled onto the loader.

If, upon weighing the parcel, it is established that the parcel is lighter (for example, up to 15 kg) than the set limits, the parcel terminal continues in its normal working mode. The limits may be set as appropriate for a particular embodiment of the terminal and are not limited to the numerical limits explicitly stated in this disclosure.

If, upon weighing the parcel, it is established that the parcel is heavier (e.g., between 15-50 kg) than the set limits, then the movement speed of the loader and main boom is slowed down according to the weight of the parcel in order to avoid upsetting the parcel during the movement of the loader and boom, or to keep it from falling out of the parcel container. The limits may be set as appropriate for a particular embodiment of the terminal and are not limited to the numerical limits explicitly stated in this disclosure.

Upon pulling the parcel onto the loader together with the parcel container, the height of the parcel is measured.

According to the height of the measured parcel, and according to the positions of other parcels as well as the vacant space on the shelves, the most suitable place is calculated for the parcel to be loaded in order to make sure that the parcel to be loaded would take up as little space as possible.

The boom transports the parcel that has been pulled onto the loader together with the parcel container, to the shelf according to the most suitable vacant place found previously.

In order to complete the session, an option is displayed in the user interface to finish the session or to start a new one, either for loading parcels or for delivering parcels.

Upon receiving the command from the user to finish the session, the door moves to its fully closed position.

If the command by the user, to finish the session or to start a new session, is not entered during the allocated time (within 10 seconds, for example), the door moves to its fully closed position and the user interface is deactivated.

Figure 18A:
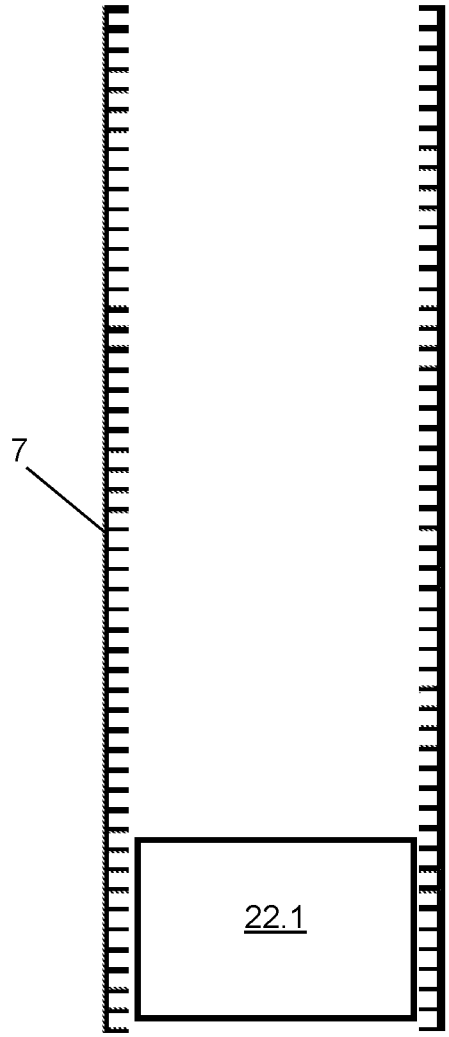
FIGS. 18a and 18b diagrammatic views of an example refrigerated parcel container being stored on a shelf of an example parcel terminal according to the present disclosure.
Figure 18B:
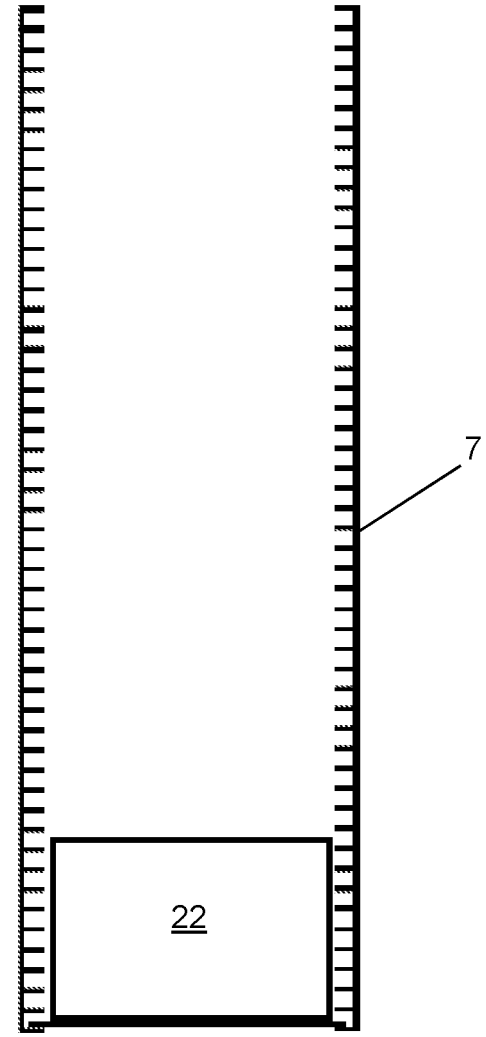

FIGS. 18a and 18b are diagrammatic views illustrating an example refrigerated container 22 loaded onto a shelf of a parcel terminal according to the present disclosure. The refrigerated container 22 may be a cuboid, with one wall 22.1 of the refrigerated container coupled to the frame of the shelving tower, in an embodiment. FIG. 18a diagrammatically illustrates the rear wall 22.1 of the refrigerated container coupled to the shelving tower, behind the rails, while FIG. 18b diagrammatically illustrates the container 22 placed on a shelf, with the rear wall 22.1 being joined to the rear of the refrigerated container 22 and therefore obscured from view in FIG. 18b. Accordingly, the refrigerated container 22 may be sealed on its other five sides and, when loaded on a predetermined shelf so as to line up with its wall 22.1 that is coupled to the frame of the shelving tower, may be sealed on all sides so as to preserve the temperature of food or other perishable items inside the container.

A lower portion of the refrigerated container may be similar to or the same as with other, non-sealed parcel containers 9 in the parcel terminal, and accordingly may be loaded on to a shelf in the parcel terminal in the same manner as other parcel containers 9. As noted above, however, a specific shelf or shelves for a refrigerated container may be predetermined.

Though noted as "refrigerated," a refrigerated container according to the present disclosure may simply be insulated so as to passively maintain the temperature of food or other goods placed inside the container for an extended period of time. Additionally or alternatively, a refrigerated container according to the present disclosure may include active cooling elements (i.e., electrical refrigeration elements), or may be fluidly coupled with the HVAC system of the parcel terminal to receive cooled air or other temperature adjustments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure. Still further, even where certain features, elements, or functionality is described with respect to absolute terminology (i.e., "is," "will," etc.), it should be understood that such features, elements, or functionality is still intended to be demonstrative rather than limiting.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A parcel terminal comprising:
   a body having a base frame, a roof frame and side panels;
   an upright parcel transportation boom inside the body attached on top of a rotating base located on the base frame;
   a loader attached to the boom and being configured to move vertically along the boom;
   a shelving unit comprising a plurality of shelves, the shelves separated by predetermined distances along a dimension of the shelving unit, each shelf comprising a rail configured to support a parcel container;
   an opening through which a user may receive or insert a parcel;
   a multitude of parcel containers configured to be disposed adjacent to the opening one at a time and to receive the parcel;
   wherein the loader is configured to transfer the parcel container; and
   an electronic controller in electronic communication with the loader configured to determine a number of open shelves required to accommodate the parcel based on a height of the parcel, to select a set of shelves having at least the required number of open shelves, and to initiate movement of the loader to transfer the parcel container, while the parcel is on or in the parcel container, from adjacent to the opening to the selected set of shelves.

2. The parcel terminal of claim 1, wherein each of the multitude of parcel containers comprises:
   a base portion configured to support the parcel;
   one or more sidewalls extending upwards from the base portion; and
   a lateral portion, extending outward from the base portion or from the one or more sidewalls and configured to support the parcel container on the rail of a shelf.

3. The parcel terminal of claim 1, wherein the electronic controller is further configured to, after initiating movement of the loader to transfer the parcel container from adjacent to the opening to the selected set of shelves, initiate a further movement of the loader to transfer the parcel container from adjacent to the opening to enable user pickup of the parcel.

4. The parcel terminal of claim 3, further comprising a scanner configured to read a QR code, bar code, or other unique code that identifies the user or the parcel;
   wherein the electronic controller is in electronic communication with the scanner and is configured to initiate the further movement of the loader in response to data captured by the scanner.

5. The parcel terminal of claim 1, wherein the plurality of shelves are evenly spaced along a dimension of the shelving unit.

6. The parcel terminal of claim 1, further comprising one or more of:
   a camera configured to capture an image of the parcel, wherein the electronic controller is configured to determine the height of the parcel according to the image; or
   one or more light curtains, wherein the electronic controller is configured to determine the height of the parcel according to a quantity of the one or more light curtains that are obstructed by the parcel.

7. The parcel terminal of claim 1, wherein the electronic controller comprises or is in communication with a memory device storing an inventory of the parcel terminal, wherein the electronic controller is configured to select a set of shelves further according to the inventory of the parcel terminal.

8. The parcel terminal of claim 1, further comprising a refrigerated parcel container.

9. The parcel terminal of claim 1, wherein the electronic controller is further configured to:
   determine that a set of shelves having the required number of open shelves is not available; and initiate movement of the loader to rearrange one or more parcel containers having a parcel stored in the terminal to yield a set of shelves having the required number of open shelves.

10. The parcel terminal of claim 1, wherein the body is cylindrical, octagonal, or hexadecagonal.

11. A computerized method of controlling a parcel terminal, the parcel terminal comprising a body, having a base frame, a roof frame and side panels;
an upright parcel transportation boom inside the body attached on top of a rotating base located on the base frame;
a loader attached to the boom and being configured to move vertically along the boom;
a shelving unit having a plurality of shelves that are separated by respective predetermined distances along a dimension of the unit, each shelf comprising a rail configured to support a parcel container, the method comprising:
providing a parcel container adjacent to an opening of the parcel terminal for a user to place a parcel on or in the parcel container through the opening;
receiving data indicative of a height of a parcel placed on or in the parcel container;
calculating a number of open shelves required to store the parcel according to the respective predetermined distances and the data indicative of the height of the parcel;
selecting a set of shelves of the plurality of shelves having the required number of open shelves; and
initiating movement of the rotating base and the loader of the parcel terminal to transfer the parcel container, containing the parcel, from adjacent to the opening to the selected set of shelves.

12. The method of claim 11, wherein the parcel container is a first parcel container, the method further comprising:
after initiating movement of the loader, providing a second parcel container adjacent to the opening for a user to place another parcel in or on the second parcel container.

13. The method of claim 11, further comprising:
determining that a set of shelves having the required number of open shelves is not available; and
initiating movement of the loader to rearrange one or more parcels stored in the terminal to yield a set of shelves having the required number of open shelves.

14. The method of claim 11, further comprising:
accessing an electronic inventory of the parcel terminal; wherein
selecting a set of shelves is based on the inventory.

15. The method of claim 11, further comprising:
after initiating movement of the loader so as to transfer the parcel container from adjacent to the opening to the selected set of shelves, initiating a further movement of the loader to transfer the parcel container to adjacent to the opening to enable user pickup of the parcel.

16. The method of claim 15, further comprising:
receiving a unique code read by a scanner of the parcel terminal, the unique code including information respective of the identity of a user or of the parcel; and
wherein initiating the further movement of the loader is responsive to receiving the code.

17. The method of claim 11, wherein initiating movement of a loader of the parcel terminal to transfer the parcel container, containing the parcel, from adjacent to the opening to the selected set of shelves comprises initiating movement of the loader to place a lateral portion of the parcel container on a rail that at least partially defines a shelf of the set of shelves.

18. The method of claim 11, wherein the data indicative of a height of a parcel placed on or in the parcel container is one or more of:
an image of the parcel captured by a camera of the parcel terminal; or
a quantity of one or more light curtains of the parcel terminal that are obstructed by the parcel.

19. The method of claim 11, further comprising:
opening an access door to a receptacle responsive to user motion around the access door detected by a motion sensor.

* * * * *